United States Patent
Mizoguchi et al.

(10) Patent No.: US 12,227,081 B2
(45) Date of Patent: Feb. 18, 2025

(54) ELECTRIC VEHICLE CONTROL METHOD AND ELECTRIC VEHICLE CONTROL DEVICE

(71) Applicant: NISSAN MOTOR CO., LTD., Yokohama (JP)

(72) Inventors: Syuta Mizoguchi, Kanagawa (JP); Akira Sawada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/721,486

(22) PCT Filed: Jan. 18, 2022

(86) PCT No.: PCT/JP2022/001658
§ 371 (c)(1),
(2) Date: Jun. 18, 2024

(87) PCT Pub. No.: WO2023/139661
PCT Pub. Date: Jul. 27, 2023

(65) Prior Publication Data
US 2024/0424912 A1    Dec. 26, 2024

(51) Int. Cl.
*B60L 15/20* (2006.01)
*B60K 1/02* (2006.01)

(52) U.S. Cl.
CPC .......... *B60L 15/20* (2013.01); *B60K 1/02* (2013.01); *B60L 2240/423* (2013.01)

(58) Field of Classification Search
CPC ...... B60L 15/20; B60L 2240/423; B60K 1/02
See application file for complete search history.

(56) References Cited

U.S. PATENT DOCUMENTS

| 8,694,189 | B2* | 4/2014 | Motosugi | B60L 15/20 701/22 |
| 9,174,524 | B2* | 11/2015 | Katsumata | B60L 15/007 |
| 9,845,022 | B2* | 12/2017 | Komatsu | B60L 15/2018 |
| 10,696,177 | B2* | 6/2020 | Fujiwara | B60L 15/08 |

(Continued)

FOREIGN PATENT DOCUMENTS

| JP | 2020-010454 A | 1/2020 |
| JP | 2020103002 A * | 7/2020 |

(Continued)

*Primary Examiner* — Luis A Martinez Borrero
(74) *Attorney, Agent, or Firm* — Foley & Lardner LLP

(57) ABSTRACT

An electric vehicle control method includes: basic torque distribution processing of determining a basic torque command value for each drive motor based on a total required driving force for the electric vehicle and driving force distribution for each of the drive systems; vibration damping processing of obtaining a corrected torque command value by performing correction for reducing vibration of a driving force transmission system on each basic torque command value; and driving force control processing of controlling a driving force generated by each drive motor based on the corrected torque command value. The vibration damping processing includes estimating whether each of the drive systems is in a dead zone section individually, and adjusting a correction amount for the basic torque command value of the drive system in the dead zone section according to the driving force distribution.

8 Claims, 16 Drawing Sheets

(56) References Cited

U.S. PATENT DOCUMENTS

| | | | |
|---|---|---|---|
| 10,972,020 B2* | 4/2021 | Sawada | B60L 50/60 |
| 10,994,619 B2* | 5/2021 | Sawada | B60L 15/2009 |
| 12,071,023 B2* | 8/2024 | Komatsu | B60L 15/2054 |
| 2002/0190683 A1* | 12/2002 | Karikomi | G05D 19/02 |
| | | | 318/632 |
| 2012/0016549 A1* | 1/2012 | Katsumata | B60W 30/20 |
| | | | 180/65.245 |
| 2012/0271456 A1* | 10/2012 | Zhang | B60L 15/2036 |
| | | | 701/1 |
| 2015/0112532 A1* | 4/2015 | Oono | B60L 15/06 |
| | | | 701/22 |
| 2018/0043792 A1* | 2/2018 | Sawada | B60W 30/18127 |
| 2018/0202379 A1* | 7/2018 | Nagashima | F02D 41/1497 |
| 2018/0230919 A1* | 8/2018 | Nagashima | F02D 41/307 |
| 2018/0273016 A1* | 9/2018 | Xu | H02K 51/00 |
| 2019/0100114 A1* | 4/2019 | Sawada | B60L 15/20 |
| 2019/0337398 A1* | 11/2019 | Fujiwara | B60L 7/08 |
| 2019/0381895 A1* | 12/2019 | Shindo | B60L 15/2081 |
| 2020/0158044 A1* | 5/2020 | Nagashima | F02D 13/04 |
| 2020/0259431 A1* | 8/2020 | Sawada | H02P 5/46 |
| 2023/0249558 A1* | 8/2023 | Komatsu | B60L 3/0076 |
| | | | 701/22 |

FOREIGN PATENT DOCUMENTS

| | | |
|---|---|---|
| WO | WO-2017/183231 A1 | 10/2017 |
| WO | WO-2018/220805 A1 | 12/2018 |

* cited by examiner

ELECTRIC VEHICLE CONTROL METHOD AND ELECTRIC VEHICLE CONTROL DEVICE

TECHNICAL FIELD

The present invention relates to an electric vehicle control method and an electric vehicle control device.

BACKGROUND ART

WO2017/183231A1 discloses a control method for reducing vibration of a driving force transmission system in an electric vehicle that can be driven using torque from an electric motor, in consideration of transmission characteristics of a power transmission mechanism connected between an output shaft of a drive motor and driving wheels. Especially, in this control method, a dead zone section in which the drive motor torque is not transmitted to drive shaft torque of the electric vehicle is estimated, and processing of accelerating response of the drive shaft torque is performed in the dead zone section, thereby preventing shock due to influence of gear backlash.

SUMMARY OF INVENTION

Problem to be Solved by the Invention

On the other hand, inventors of the present invention have focused on the point that, in the case of an electric vehicle that includes a plurality of drive systems that are individually provided with drive motors and drive different driving wheels, the timing at which the backlash of the gear is clogged differs for each drive system due to a difference in driving force distribution between the drive systems, and a length of the dead zone section may vary. For this reason, even when the electric vehicle control method in the related art is applied to the electric vehicle including the plurality of drive systems, torque response performance of the electric vehicle in the dead zone section may be changed depending on a traveling state, and an occupant may feel uncomfortable.

Therefore, an object of the present invention is to provide an electric vehicle control method and an electric vehicle control device capable of reducing a sense of discomfort of an occupant caused by a variation in length of a dead zone section of each drive system in an electric vehicle including a plurality of drive motors.

Means for Solving the Problem

One aspect of the present invention is to provide an electric vehicle control method for controlling a driving force of each drive system in an electric vehicle equipped with a plurality of drive systems each including a drive motor. The electric vehicle control method includes: basic torque distribution processing of determining a basic torque command value for each drive motor based on a total required driving force for the electric vehicle and driving force distribution for each of the drive systems; vibration damping processing of obtaining a corrected torque command value by performing correction for reducing vibration of a driving force transmission system on each basic torque command value; and driving force control processing of controlling a driving force generated by each drive motor based on the corrected torque command value. The vibration damping processing includes estimating whether each of the drive systems is in a dead zone section individually, and adjusting a correction amount for the basic torque command value of the drive system in the dead zone section according to the driving force distribution.

DESCRIPTION OF EMBODIMENTS

Embodiments of the present invention will be described below with reference to the drawings.

First Embodiment

Figure 1:
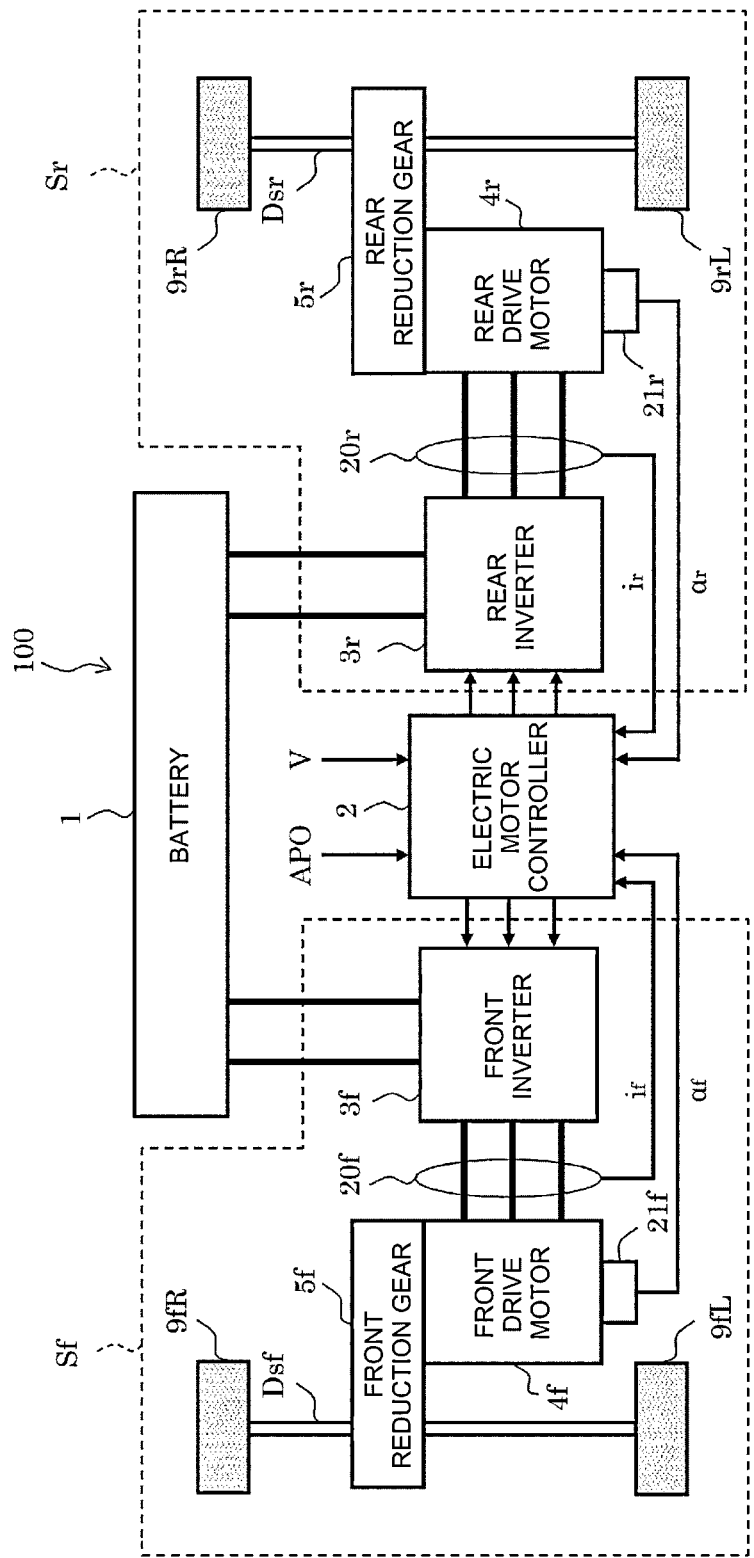
FIG. 1 is a block diagram illustrating a main configuration of an electric vehicle in which an electric vehicle control method according to each embodiment is executed.

FIG. 1 is a block diagram illustrating a main configuration of an electric vehicle 100 in which an electric vehicle control method is executed. Note that the electric vehicle 100 in the present embodiment means a vehicle such as an electric vehicle (EV) or a hybrid electric vehicle (HEV) equipped with one or a plurality of electric motors (drive motors 4) as a traveling drive source. Specifically, the electric vehicle 100 of the present embodiment includes a front drive system $S_f$ including the drive motor 4 (front drive motor 4*f*) that provides a driving force to front driving wheels 9*f*R and 9*f*L, and a rear drive system S*r* including the drive motor 4 (rear drive motor 4*r*) that provides a driving force to rear driving wheels 9*r*R and 9*r*L.

Note that in the following description, for simplification, the constituent elements in the front drive system S*f* and the rear drive system S*r* will be comprehensively described together with a reference numeral such as "drive system S*f*, S*r*". That is, the following description is common to the constituent elements in the front drive system S*f* and the rear drive system S*r* unless otherwise specified.

A battery 1 is an in-vehicle secondary battery capable of supplying drive power (discharging) during power running operation of the drive motor 4*f*, 4*r* and receiving regenerative power (charging) during regenerative operation.

An electric motor controller 2 receives signals indicating various vehicle variables such as a vehicle speed V, an accelerator opening APO, a rotor phase $a_f$, $a_r$ of the drive motor 4*f*, 4*r*, and a motor current $i_f$, $i_r$, which is a current flowing through the drive motor 4*f*, 4*r*, as digital signals. The electric motor controller 2 generates a PWM signal for controlling the drive motor 4*f*, 4*r* based on the input signals. The electric motor controller 2 also generates a drive signal for an inverter 3*f*, 3*r* according to the generated PWM signal.

The inverter 3*f*, 3*r* converts a direct current supplied from the battery 1 into an alternating current by turning on and off two switching elements (for example, power semiconductor elements such as IGBTs and MOS-FETs) provided for each phase, and flows a desired current to the drive motor 4*f*, 4*r*.

The drive motor 4*f*, 4*r* generates a driving force by the alternating current supplied from the inverter 3*f*, 3*r*, and transmits the driving force to the driving wheel 9*f*R, 9*f*L, 9*r*R, 9*r*L via a driving force transmission system including a reduction gear 5*f*, 5*r* and a drive shaft Dsf, Dsr. The drive motor 4*f*, 4*r* recovers kinetic energy based on a regenerative braking force received from the driving wheel 9*f*R, 9*f*L, 9*r*R, 9*r*L as electric energy when the vehicle is traveling. In this case, the inverter 3 converts the alternating current generated during regenerative operation of the drive motor 4 into a direct current and supplies the direct current to the battery 1. Especially, the front drive motor 4*f* supplies a driving force to the front driving wheels 9*f*R and 9*f*L, and the rear drive motor 4*r* supplies a driving force to the rear driving wheels 9*r*R and 9*r*L.

A current sensor 20 detects a motor current $i_f$, $i_r$ (particularly, front three-phase alternating currents $i_{uf}$ and $i_{vf}$ and $i_{wf}$ and rear three-phase alternating currents $i_{ur}$ and $i_{vr}$ and $i_{wr}$). However, since the sum of the three-phase alternating currents $i_u$, $i_v$, and $i_w$ is 0, the currents of any two phases may be detected, and the current of the remaining one phase may be calculated.

A rotation sensor 21 is, for example, a resolver or an encoder, and detects the rotor phase $a_f$, $a_r$ of the drive motor 4*f*, 4*r*.

Figure 2:
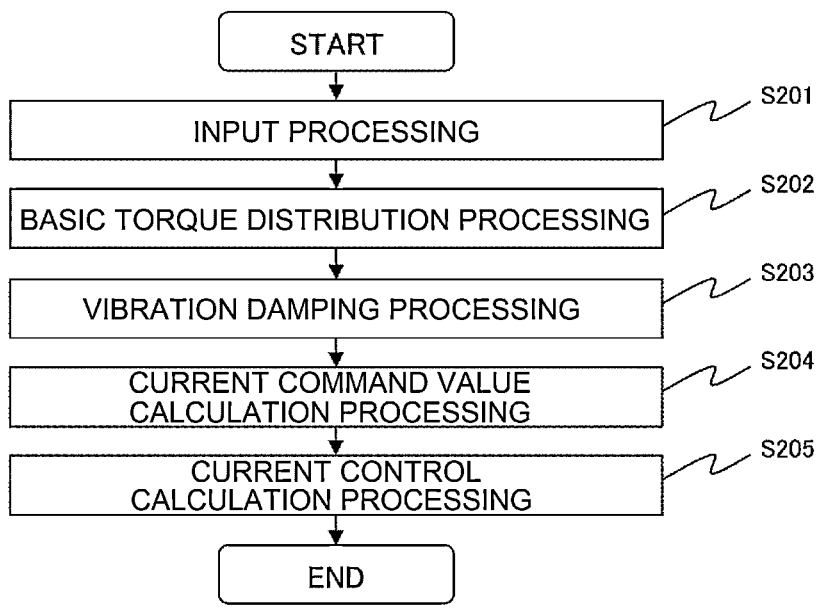
FIG. 2 is a flowchart showing a flow of processing of the electric vehicle control method.

FIG. 2 is a flowchart showing each processing in the electric vehicle control method programmed to be executed by the electric motor controller 2. Note that the processing according to steps S201 to S205 shown in FIG. 2 is repeatedly executed at a predetermined calculation cycle while a vehicle system is activated.

In step S201, the electric motor controller 2 executes input processing. Specifically, the electric motor controller 2 receives the signals indicating various vehicle states as vehicle information. Specifically, the signals indicating the vehicle states include the vehicle speed V (km/h), the accelerator opening APO (%), the rotor phase $a_f$, $a_r$ (rad), a motor rotation speed $N_{mf}$, $N_{mr}$ (rpm), which is a rotation speed of the drive motor 4*f*, 4*r*, the motor current $i_f$, $i_r$, and a DC voltage value $V_{dc}$ (V) of the battery 1.

The vehicle speed V (km/h) is obtained from a meter or other controllers such as a brake controller through communication. Note that the electric motor controller 2 may calculate a vehicle speed v (m/s) by multiplying a mechanical angular velocity $\omega_m$ of the drive motor 4 (for example, either one of a front mechanical angular velocity $\omega_{mf}$ and a rear mechanical angular velocity $\omega_{mr}$) by a tire dynamic radius r, and then dividing the product by a gear ratio of a final gear, and may obtain the vehicle speed V (km/h) by performing unit conversion by multiplying the vehicle speed v (m/s) by 3600/1000.

The accelerator opening APO (%) is obtained from an accelerator opening sensor (not shown) or from other controllers such as a vehicle controller (not shown) through communication.

The rotor phase $a_f$, $a_r$ (rad) is obtained from a rotation sensor 21. The electric motor controller 2 differentiates the rotor phase $a_f$, $a_r$ to calculate a rotor angular velocity $\omega_{ef}$, $\omega_{er}$ (electric angular velocity) of the drive motor 4*f*, 4*r*. The electric motor controller 2 calculates a motor rotation angular velocity $\omega_{mf}$, $\omega_{mr}$ (rad/s), which is the mechanical angular velocity of the drive motor 4*f*, 4*r*, by dividing the rotor angular velocity $\omega_{ef}$, $\omega_{er}$ by the number p of pole pairs of the drive motor 4*f*, 4*r*. Further, the electric motor controller 2 calculates a motor rotation speed $N_{mf}$, $N_{mr}$ (rpm) by multiplying the motor rotation angular velocity $\omega_{mf}$, $\omega_{mr}$ by a unit conversion coefficient (60/2 π).

The motor current $i_f$, $i_r$ (A) is obtained from the current sensor 20. The DC voltage value $V_{dc}$ (V) is detected by a voltage sensor (not shown) provided in a DC power supply line between the battery 1 and the inverter 3. Note that a power supply voltage value obtained by a battery controller (not shown) may be obtained as the DC voltage value $V_{dc}$ (V).

Figure 3:
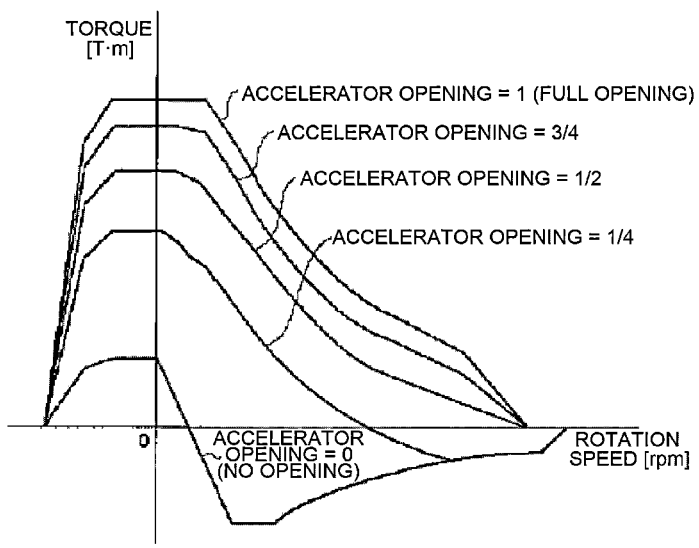
FIG. 3 is a diagram showing an example of an accelerator opening-torque table.

In step S202, the electric motor controller 2 executes basic torque distribution processing. Specifically, the electric motor controller 2 sets a basic total torque command value $T_m^*$ which is a target value of a total required driving force for the electric vehicle 100 by referring to an accelerator opening-torque table shown in FIG. 3 based on the accelerator opening APO, the vehicle speed V, and the motor rotation speed $N_m$.

Figure 4:
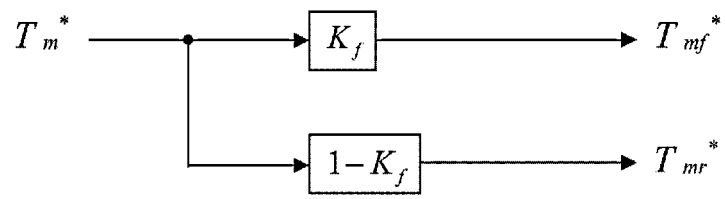
FIG. 4 is a block diagram illustrating front-rear torque distribution processing.

Further, the electric motor controller 2 executes front-rear torque distribution processing shown in FIG. 4. Specifically, the electric motor controller 2 multiplies the basic total torque command value $T_m^*$ by a front distribution gain $K_f$ (0≤$K_f$≤1) to obtain a front basic torque command value $T_{mf}^*$ corresponding to a target value of the driving force distributed to the front drive system S*f*. The electric motor controller 2 multiplies the basic total torque command value $T_m^*$ by a rear distribution gain (1−$K_f$) to obtain a rear basic torque command value $T_{mr}^*$ corresponding to a target value of the driving force distributed to the rear drive system S*r*.

Next, in step S203, the electric motor controller 2 executes vibration damping processing. Specifically, the electric motor controller 2 obtains a front final torque command value $T_{mf}^*$ by performing correction on the front basic torque command value $T_{mf}^*$ for reducing vibration of the driving force transmission system (such as torsional vibration of a front drive shaft Dsf). On the other hand, the electric motor controller 2 obtains a rear final torque command value $T_{mrf}^*$ by performing vibration compensation calculation on the rear basic torque command value $T_{mr}^*$ for reducing vibration of the driving force transmission system (such as torsional vibration of a rear drive shaft Dsr). Details of the vibration damping processing will be described later.

In step S204, the electric motor controller 2 executes current command value calculation processing. Specifically, the electric motor controller 2 refers to a predetermined table to determine a d-axis current target value $i_{df}^*$, $i_{dr}^*$ and a q-axis current target value $i_{qf}^*$, $i_{qr}^*$ of the front drive motor 4f and the rear drive motor 4r respectively, based on the final torque command value $T_{mff}^*$, $T_{mrf}^*$ obtained in step S203, the motor rotation angular velocity $\omega_{mf}$, $\omega_{mr}$, and the DC voltage value $V_{dc}$.

In step S205, the electric motor controller 2 executes current control calculation processing. Specifically, the electric motor controller 2 performs control for matching a d-axis current $i_{df}$ and a q-axis current $i_{qf}$ of the front drive motor 4f with the d-axis current target value $i_{df}^*$ and the q-axis current target value $i_{qf}^*$, respectively, and for matching a d-axis current $i_{dr}$ and a q-axis current $i_{qr}$ of the rear drive motor 4r with the d-axis current target value $i_{dr}^*$ and the q-axis current target value $i_{qr}^*$, respectively.

More specifically, the electric motor controller 2 generates a PWM signal based on the d-axis current target value $i_{df}^*$, $i_{dr}^*$ and the q-axis current target value $i_{qf}^*$, $i_{qr}^*$ of the drive motor 4f, 4r. By turning on and off the switching elements of the front inverter 3f and the rear inverter 3r based on the PWM signals obtained in this manner, the front drive motor 4f and the rear drive motor 4r can be driven with respective desired torques.

Hereinafter, details of the vibration damping processing S203 will be described.

Figure 5:
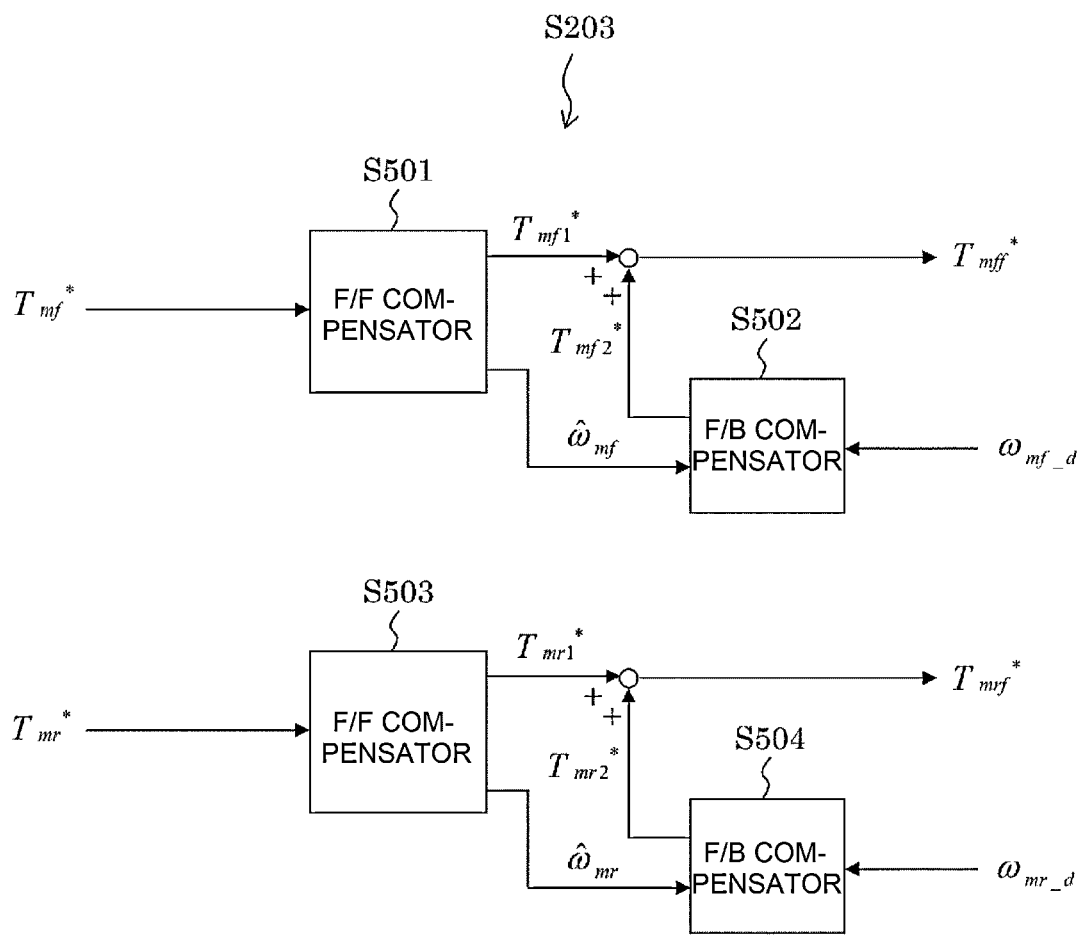
FIG. 5 is a block diagram illustrating vibration damping processing according to a first embodiment.

FIG. 5 is a block diagram illustrating the vibration damping processing according to the present embodiment. Specifically, the vibration damping processing S203 of the present embodiment includes a configuration (upper diagram of FIG. 5) for performing processing of reducing vibration of the driving force transmission system in the front drive system $S_f$ and a configuration (lower diagram of FIG. 5) for performing processing of reducing vibration of the driving force transmission system in the rear drive system $S_r$. Note that in the following, in order to simplify the description, components of the front drive system $S_f$ and the rear drive system $S_r$ are collectively described with reference numerals thereof together.

As illustrated, the vibration damping processing S203 includes an F/F compensator S501, S503 and an F/B compensator S502, S504.

Figure 6:
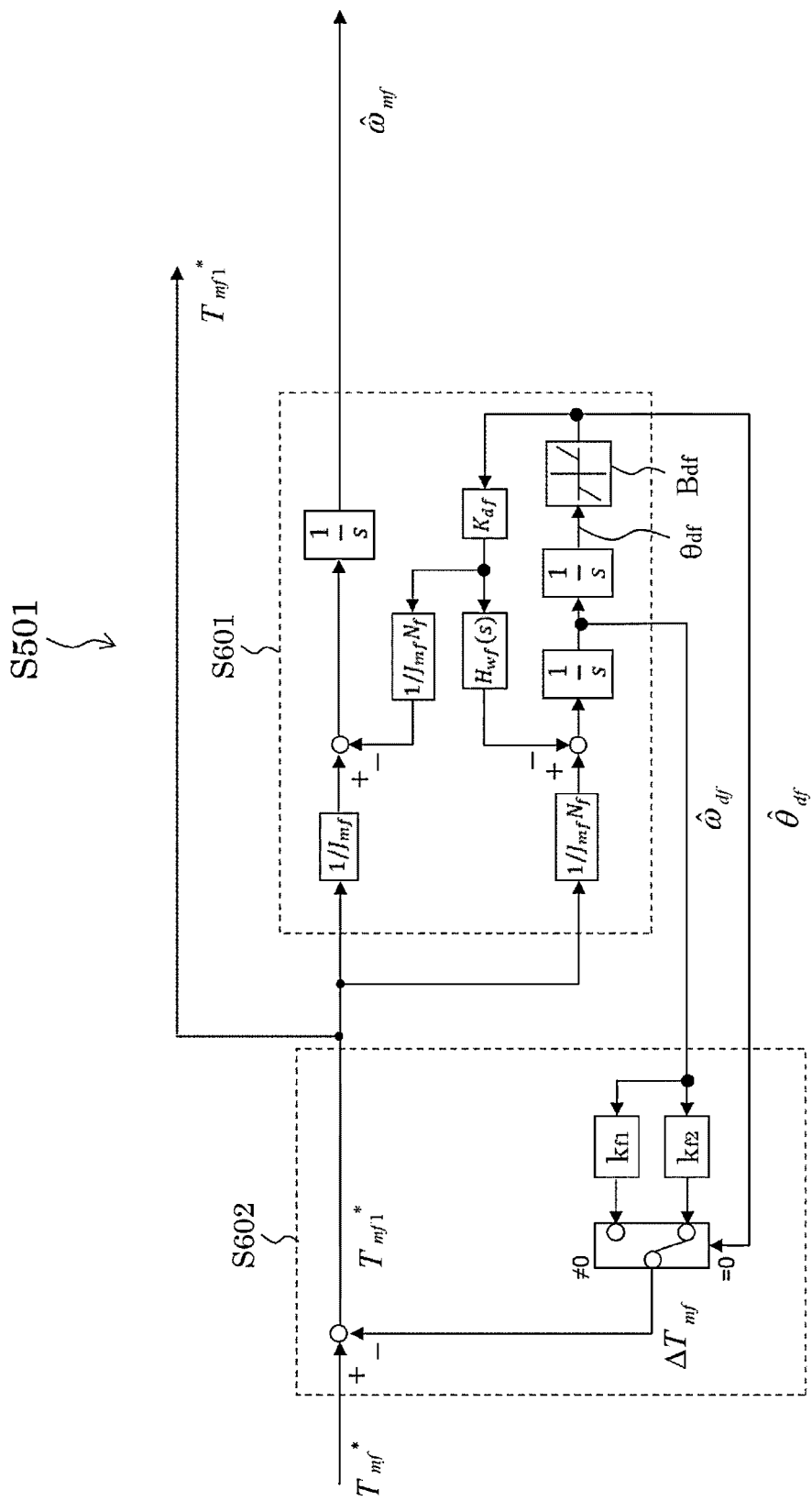
FIG. 6 is a block diagram illustrating an F/F compensator of a front drive system according to the first embodiment.
Figure 7:
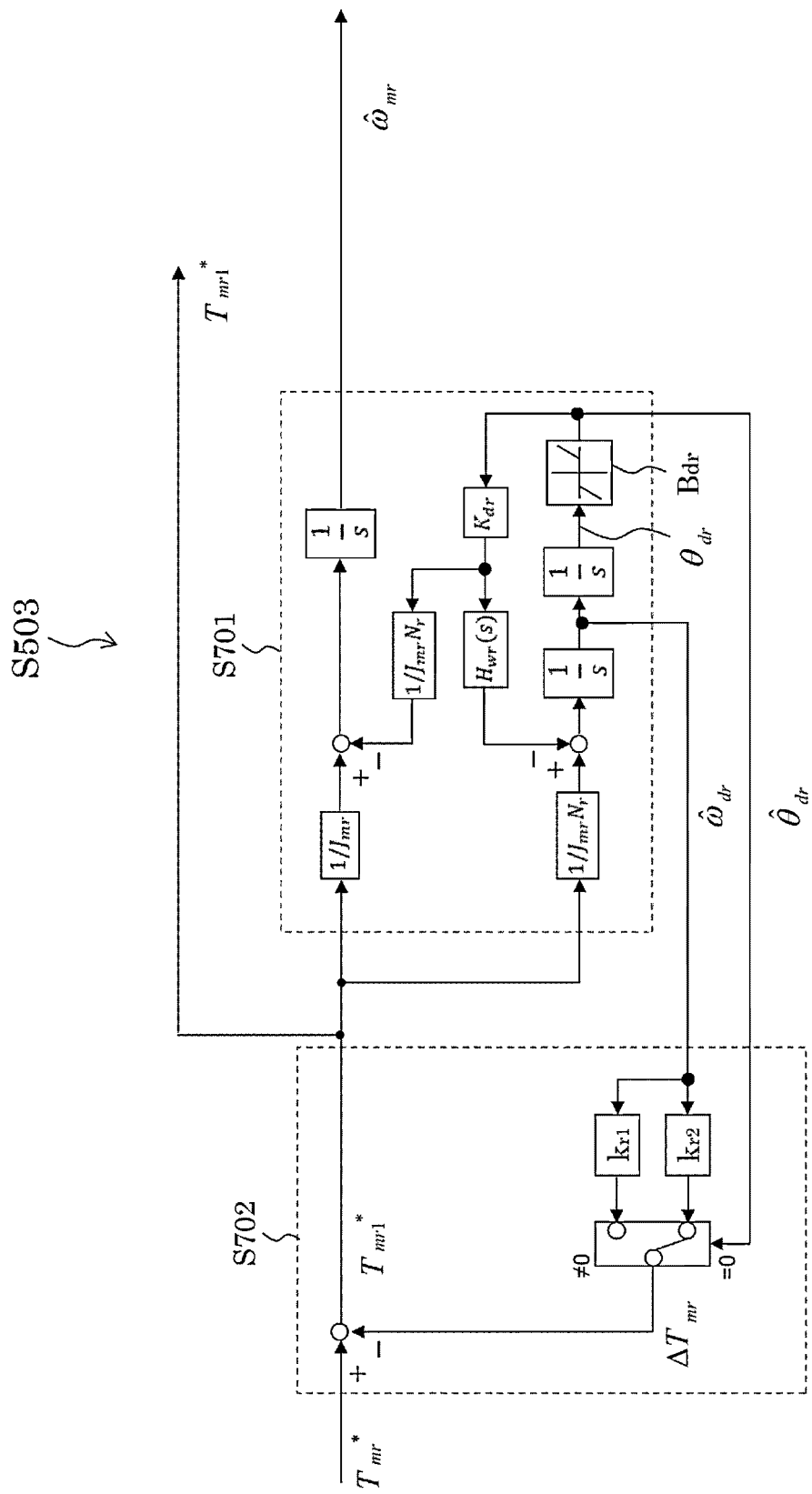
FIG. 7 is a block diagram illustrating an F/F compensator of a rear drive system according to the first embodiment.

FIGS. 6 and 7 are block diagrams illustrating the F/F compensator S501, S503. As illustrated, the F/F compensator S501, S503 includes a vehicle model S601, S701 and a torque correction unit S602, S702.

The vehicle model S601, S701 receives a first torque command value $T_{mf1}^*$, $T_{mr1}^*$ obtained by the torque correction unit S602, S702, and obtains a torsional angular velocity estimation value $\hat{\omega}_{df}$, $\hat{\omega}_{dr}$ and a torsional angle estimation value $\hat{\theta}_{df}$, $\hat{\theta}_{dr}$ of the drive shaft Dsf, Dsr using a dead zone model simulating driving force characteristics of the electric vehicle 100. Here, the torsional angular velocity estimation value $\hat{\omega}_{df}$, $\hat{\omega}_{dr}$ is fed back to the torque correction unit S602, S702, and functions as an index for determining a correction amount for reducing vibration in the torque correction unit S602, S702. On the other hand, the torsional angle estimation value $\hat{\theta}_{df}$, $\hat{\theta}_{dr}$ is fed back to the torque correction unit S602, S702, and functions as an index for determining whether each of the drive systems $S_f$ and $S_r$ is in a dead zone section.

Note that the dead zone section of the drive system $S_f$, $S_r$ means a section in which an output torque (hereinafter, also referred to as "motor torque $T_{mf}$, $T_{mr}$") of the drive motor 4f, 4r is not transmitted to a torque (hereinafter, also referred to as "drive shaft torque $T_{df}$, $T_{dr}$") of the drive shaft Dsf, Dsr during a period such as when gear backlash is clogged. Especially, the dead zone section of the drive system $S_f$, $S_r$ is individually defined for the front drive system $S_f$ and the rear drive system $S_r$. A state in which both the drive systems $S_f$ and $S_r$ are in a dead zone section (a state in which there is no torque response of the electric vehicle 100) is appropriately referred to as a "dead zone section of the electric vehicle 100".

The vehicle model S601, S701 obtains an estimation value of a motor rotation angular velocity $\omega_{mf}$, $\omega_m$ (hereinafter, also referred to as "motor rotation angular velocity estimation value $\hat{\omega}_{mf}$, $\hat{\omega}_{mr}$") on the basis of the first torque command value $T_{mf1}^*$, $T_{mr1}^*$, and outputs the estimation value to the F/B compensator S502, S504.

The torque correction unit S602, S702 receives the basic torque command value $T_{mf}^*$, $T_{mr}^*$, the torsional angle estimation value $\hat{\theta}_{df}$, $\hat{\theta}_{dr}$, and the torsional angular velocity estimation value $\hat{\omega}_{df}$, $\hat{\omega}_{dr}$, and calculates the first torque command value $T_{mf1}^*$, $T_{mr1}^*$. Specifically, the torque correction unit S602, S702 obtains a vibration compensation torque $\Delta T_{mf}$, $\Delta T_{mr}$ by multiplying the torsional angular velocity estimation value $\hat{\omega}_{df}$, $\hat{\omega}_{dr}$ by a predetermined feedback gain, and calculates the first torque command value $T_{mf1}^*$, $T_{mr1}^*$ by subtracting the vibration compensation torque $\Delta T_{mf}$, $\Delta T_{mr}$ from the basic torque command value $T_{mf}^*$, $T_{mr}^*$.

Specifically, the torque correction unit S602, S702 calculates the vibration compensation torque $\Delta T_{mf}$, $\Delta T_{mr}$ using a normal gain $k_{f1}$, $k_{r1}$ or a dead zone gain $k_{f2}$, $k_{r2}$, which will be described later, as the feedback gain, in accordance with a reference result of the torsional angle estimation value $\hat{\theta}_{df}$, $\hat{\theta}_{dr}$ input from the vehicle model S601, S701. More specifically, when the torsional angle estimation value $\hat{\theta}_{df}$, $\hat{\theta}_{dr}$ is not zero (when it is estimated that the drive system $S_f$, $S_r$ is in a normal section other than the dead zone section), the torque correction unit S602, S702 obtains the vibration compensation torque $\Delta T_{mf}$, $\Delta T_{mr}$ by multiplying the torsional angular velocity estimation value $\hat{\omega}_{df}$, $\hat{\omega}_{dr}$ by the normal gain $k_{f1}$, $k_{r1}$. On the other hand, when the torsional angle estimation value $\hat{\theta}_{df}$, $\hat{\theta}_{dr}$ is zero (when it is estimated that the drive system $S_f$, $S_r$ is in the dead zone section), the torque correction unit S602, S702 obtains the vibration compensation torque $\Delta T_{mf}$, $\Delta T_{mr}$ by multiplying the torsional angular velocity estimation value $\hat{\omega}_{df}$, $\hat{\omega}_{dr}$ by the dead zone gain $k_{f2}$, $k_{r2}$.

The vehicle models S601 and S701 shown in FIGS. 6 and 7 will be described in detail.

Figure 8:
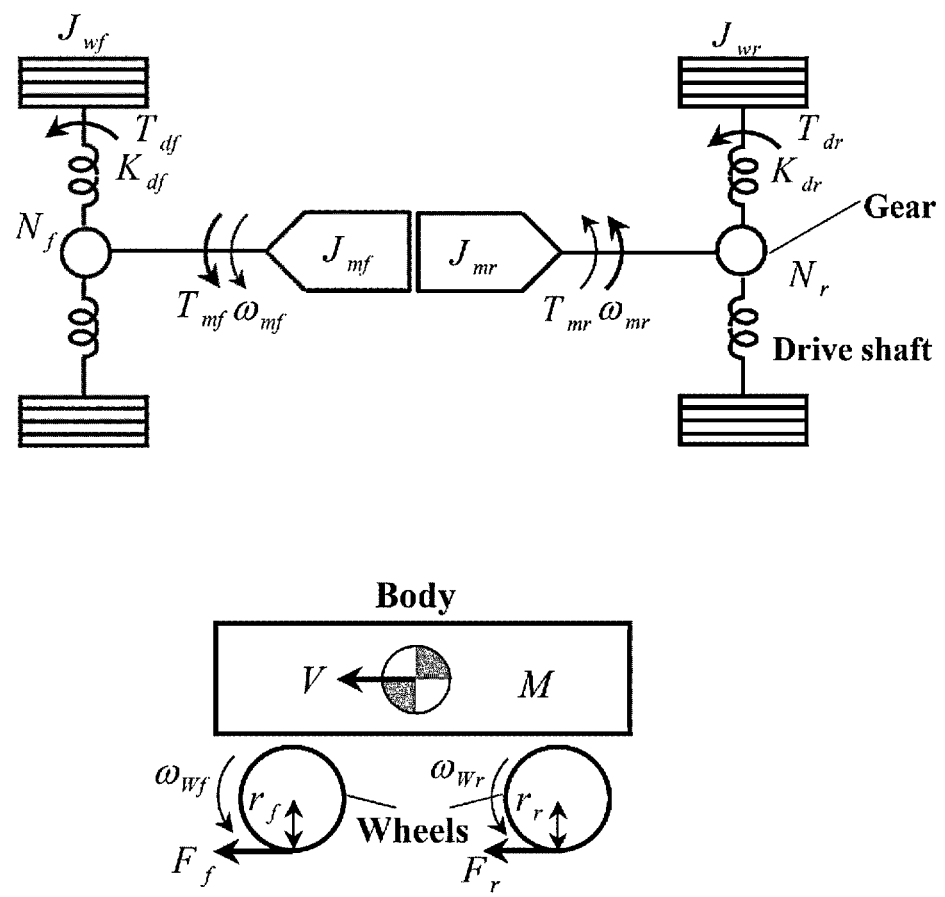
FIG. 8 is a diagram showing a model of a driving force transmission system of an electric vehicle (4WD).

FIG. 8 is a diagram illustrating a model of the driving force transmission system of the electric vehicle 100. Note that definitions of parameters including those already described will be described below.

$J_{mf}$, $J_{mr}$: motor inertia $J_{wf}$, $J_{wr}$: driving wheel inertia (for one shaft)

$K_{df}$, $K_{dr}$: torsional rigidity of drive shaft $K_{tf}$, $K_{tr}$: coefficient relating to friction between tire and road surface $N_f$, $N_r$: over-all gear ratio $r_f$, $r_r$: tire load radius $\omega_{mf}$, $\omega_{mr}$: motor rotation angular velocity $\hat{\omega}_{mf}$, $\hat{\omega}_{mr}$: motor rotation angular velocity estimation value $\theta_{mf}$, $\theta_{mr}$: motor rotation angle $\omega_{wf}$, $\omega_{wr}$: driving wheel angular velocity $\theta_{wf}$, $\theta_{wr}$: driving wheel angle $T_{mf}$, $T_{mr}$: motor torque
$T_{df}$, $T_{dr}$: drive shaft torque
$F_f$, $F_r$: driving force (for two shafts)
$\theta_{df}$, $\theta_{dr}$: torsional angle of drive shaft
$\omega_{df}$, $\omega_{dr}$: torsional angular velocity of drive shaft
V: vehicle speed
M: vehicle weight From FIG. 8, equations of motion of the 4WD electric vehicle 100 are expressed by the following equations (1) to (11).

[Math. 1]
$$J_{mf} \cdot \dot{\omega}_{mf} = T_{mf} - T_{df}/N_f \quad (1)$$

[Math. 2]
$$J_{mr} \cdot \dot{\omega}_{mr} = T_{mr} - T_{dr}/N_r \quad (2)$$

[Math. 3]
$$2J_{wf} \cdot \dot{\omega}_{wf} = T_{df} - r_f F_f \quad (3)$$

[Math. 4]
$$2J_{wr} \cdot \dot{\omega}_{wr} = T_{dr} - r_r F_r \quad (4)$$

[Math. 5]
$$M \cdot \dot{V} = F_f + F_r \quad (5)$$

[Math. 6]
$$T_{df} = K_{df} \theta_{df} \quad (6)$$

[Math. 7]
$$T_{dr} = K_{dr} \cdot \theta_{dr} \quad (7)$$

[Math. 8]
$$F_f = K_{tf} \cdot (r_f \omega_{wf} - V) \quad (8)$$

[Math. 9]
$$F_r = K_{tr} \cdot (r_r \omega m_r - V) \quad (9)$$

[Math. 10]
$$\theta_{df} = \theta_{mf}/N_f - \theta_{wf} \quad (10)$$

[Math. 11]
$$\theta_{dr} = \theta_{mr}/N_r - \theta_{wr} \quad (11)$$

By performing Laplace transform on the above equations (1) to (11), the transmission characteristic from the front motor torque $T_{mf}$ to the front motor rotation angular velocity $\omega_{mf}$ is expressed by the following equations (12) and (13).

[Math. 12]
$$\omega_{mf} = G_p(s) \cdot T_{mf} \quad (12)$$

[Math. 13]
$$G_p(s) = \frac{1}{s} \cdot \frac{b_3 s^3 + b_2 s^2 + b_1 s + b_0}{a_3 s^3 + a_2 s^2 + a_1 s + a_0} \quad (13)$$

In the equation (13), $a_3$, $a_2$, $a_1$, $a_0$, $b_3$, $b_2$, $b_1$, and $b_0$ are respectively represented by the following equations in (14).

[Math. 14]
$$a_3 = 2 J_{mf} J_{wf} M$$
$$a_2 = 2 K_{tf} J_{mf} (2 J_{wf} + r_f^2 M)$$
$$a_1 = K_{df} M (J_{mf} + 2 J_{wf}/N_f^2)$$
$$a_0 = K_{df} K_{tf} (J_{mf} + 2 J_{wf}/N_f^2 + r_f^2 M/N_f^2)$$
$$b_3 = 2 J_{wf} M$$
$$b_2 K_{tf}(2 J_{wf} + r_f^2 M))$$
$$b_1 = K_{df} M$$
$$b_0 = K_{df} K_{tf} \quad (14)$$

The transmission characteristic from the front motor torque $T_{mf}$ to the front drive shaft torque $T_{df}$ is expressed by the following equation (15).

[Math. 15]
$$\frac{T_{df}}{T_{mf}} = \frac{c_1 s + c_0}{a_3 s^3 + a_2 s^2 + a_1 s + a_0} \quad (15)$$

In the equation (15), $c_1$ and $c_2$ are represented by the following equations in (16).

[Math. 16]
$$c_1 = 2 K_{df} J_{wf} M/N_f$$
$$c_0 = K_{df} K_{tf} (2 J_{wf} + r_f^2 M)/N_f^2 \quad (16)$$

From the equations (3), (6), (8), and (10), the transmission characteristic from the front motor rotation angular velocity $\omega_{mf}$ to the front driving wheel angular velocity $\omega_{wf}$ is expressed by the following equation (17).

[Math. 17]
$$\frac{\omega_{wf}}{\omega_{mf}} = \frac{b_1 s + b_0}{b_3 s^3 + b_2 s^2 + b_1 s + b_0} \cdot \frac{1}{N_f} \quad (17)$$

From the equations (12), (13), and (17), the transmission characteristic from the front motor torque $T_{mf}$ to the front driving wheel angular velocity $\omega_{wf}$ is expressed by the following equation (18).

[Math. 18]
$$\frac{\omega_{wf}}{T_{mf}} = \frac{1}{N_f} \cdot \frac{1}{s} \cdot \frac{b_1 s + b_0}{a_3 s^3 + a_2 s^2 + a_1 s + a_0} \quad (18)$$

From the equations (15) and (18), the transmission characteristic from the front drive shaft torque $T_{df}$ to the front driving wheel angular velocity $\omega_{wf}$ is expressed by the following equation (19).

[Math. 19]
$$\omega_{wf} = \frac{1}{N_f} \cdot \frac{1}{s} \cdot \frac{b_1 s + b_0}{c_1 s + c_0} T_{df} \quad (19)$$

Here, when the equation (1) is transformed, the following equation (20) is obtained.

[Math. 20]
$$\frac{\omega_{wf}}{N_f} = \frac{1}{J_{mf} N_f s} T_{mf} - \frac{1}{J_{mf} N_f^2 s} T_{df} \quad (20)$$

Therefore, according to the equations (19) and (20), the torsional angular velocity $\omega_{df}$ of the front drive shaft Dsf can be expressed by the following equation (21).

[Math. 21]

$$\omega_{df} = \frac{\omega_{mf}}{N_f} - \omega_{wf} = \frac{1}{J_{mf}N_f s}T_{mf} - \frac{1}{J_{mf}N_f^2 s}T_{df} - \frac{1}{N_f} \cdot \frac{1}{s} \cdot \frac{b_1 s + b_0}{c_1 s + c_0}T_{df} = \frac{1}{s} \cdot \left(\frac{T_{mf}}{J_{mf}N_f} - H_{wf}(s) \cdot T_{df}\right) \quad (21)$$

In the equation (21), $H_{wf}(s)$ is determined by the following equation (22).

[Math. 22]

$$H_{wf}(s) = \frac{v_1 s + v_0}{w_1 s + w_0} \quad (22)$$

In the equation (22), $v_1$, $v_0$, $w_1$, and $w_0$ are determined by the following equations in (23).

[Math. 23]

$$v_1 = J_{mf}N_f b_1 + c_1 = 2J_{wf}MN_f(J_{mf} + K_{df}/N_f^2)$$

$$v_0 = J_{mf}N_f b_0 + c_0 = K_{df}K_{tf}(2J_{mf}N_f^2 + 2J_{wf} + r_f^2 M)/N_f$$

$$w_1 = J_{mf}N_f^2 c_1 = 2K_{df}J_{mf}J_{wf}MN_f$$

$$w_0 = J_{mf}N_f^2 c_0 = K_{df}K_{tf}J_{mf}(2J_{wf} + r_f^2 M)N_f \quad (23)$$

The equation (15) can be transformed as the following equation (24).

[Math. 24]

$$\frac{T_{df}}{T_{mf}} = \frac{c_1 s + c_0}{a_3 s^3 + a_2 s^2 + a_1 s + a_0} = \frac{c_1}{a_3} \cdot \frac{s + c_0/c_1}{(s+\alpha)(s^2 + 2\zeta_p \omega_p s + \omega_p^2)} \quad (24)$$

In the equation (24), "$\zeta_p$" is an attenuation coefficient of the torque transmission system of the front drive shaft Dsf, and "$\omega_p$" is a frequency of normal mode of vibration of the torque transmission system of the front drive shaft Dsf.

Further, since a pole $\alpha$ of the transfer function represented by the equation (24) and the zero point $c_0/c_1$ can be considered to be substantially the same, the following equation (25) is obtained by performing pole zero cancellation.

[Math. 25]

$$T_{df} = \frac{g_{tf}}{s^2 + 2\zeta_p \omega_p s + \omega_p^2} T_{mf} \quad (25)$$

In the equation (25), gif is determined by the following equation (26).
[Math. 26]

$$g_{tf} = c_0/(a_3 \cdot \alpha) \quad (26)$$

Here, according to a control logic of the torque correction unit S602 of the front drive system $S_f$ shown in FIG. 6, assuming that the first torque command value $T_{mf1}^*$ is equal to the front final torque command value $T_{mff}^*$, the front final torque command value $T_{mff}^*$ is expressed by the following equation (27) using the front basic torque command value $T_{mf}^*$ and the normal gain $k_{f1}$.
[Math. 27]

$$T_{mff}^* = T_{mf}^* - k_{f1}\omega_{df} \quad (27)$$

Thus, the front final torque command value $T_{mff}^*$ can be replaced as the following equation (28) from the equations (6) and (10).
[Math. 28]

$$T_{mff}^* = T_{mf}^* - (k_{f1}s)T_{df}/K_{df} \quad (28)$$

Then, assuming that $T_{mf} = T_{mff}^*$, when the equation (28) is substituted into the equation (24), the following equation (29) can be obtained after arrangement.

[Math. 29]

$$T_{df} = \frac{g_{tf}}{s^2(2\zeta_p \omega_p + g_{tf}k_{f1}/K_{df})s + \omega_p^2} T_{mf}^* \quad (29)$$

Here, a model response from the front motor torque to the front drive shaft torque $T_{df}$ is expressed by the following equation (30).

[Math. 30]

$$T_{df} = \frac{g_{tf}}{s^2 + 2\zeta_r \omega_p s + \omega_p^2} T_{fm}^* \quad (30)$$

A condition of the normal gain $k_{f1}$ under which the equation (29) and the equation (30) match is expressed by the following equation (31).
[Math. 31]

$$k_{f1} = 2(1-\zeta_p)\omega_p K_{df}/g_{tf} \quad (31)$$

That is, the normal gain $k_{f1}$ is determined from the viewpoint of achieving the model response in a normal section in which the front motor torque $T_{mf}$ is transmitted as the front drive shaft torque $T_{df}$.

The dead zone gain $k_{f2}$ is determined by the following equation (32).
[Math. 32]

$$k_{f2} = 2(\zeta_{yf} - \zeta_p)\omega_p K_{df}/g_{tf} \quad (32)$$

Note that in the equation (32), "$\zeta_{yf}$" represents an attenuation coefficient of a model response in the dead zone section of the front drive system $S_f$ (hereinafter also referred to as "front dead zone attenuation coefficient "$\zeta_{yf}$").

That is, the front dead zone gain $k_{f2}$ is determined from the viewpoint of achieving the model response in the dead zone section where the front motor torque $T_{mf}$ is not sufficiently transmitted as the front drive shaft torque $T_{df}$. Especially, when the front dead zone attenuation coefficient $\zeta_{yf}$ is set to be smaller than the attenuation coefficient ("1" in the present embodiment) in the model response of a normal section, according to the equations (31) and (32), the dead zone gain $k_{f2}$ becomes smaller than the normal gain $k_{f1}$. As a result, when the front drive system $S_f$ is in the dead zone section, the vibration compensation torque $\Delta T_{mf}$ determined by the product of the front torsional angular velocity $\omega_{df}$ and the dead zone gain $k_{f2}$ (that is, a reduction correction amount with respect to the front basic torque command value $T_{mf}^*$) becomes small, so that the torque response becomes faster than in the normal section.

Further, in the present embodiment, by applying the equations (1) to (23), a dead zone model simulating gear backlash characteristics in the front drive system $S_f$ is configured. The front drive shaft torque $T_{df}$ considering the dead zone model is expressed by the following equation (33).

[Math. 33]

$$T_{df} = \begin{cases} K_{df}(\theta_{df} - \theta_{deadf}/2) & (\theta_{df} \geq \theta_{deadf}/2) \\ 0 & (-\theta_{deadf}/2 < \theta_{df} < \theta_{deadf}/2) \\ K_{df}(\theta_{df} + \theta_{deadf}/2) & (\theta_{df} \leq -\theta_{deadf}/2) \end{cases} \quad (33)$$

In the equation (33), "$\theta_{deadf}$" represents an overall gear backlash amount from the front drive motor 4f to the front drive shaft Dsf.

Further, the normal gain $k_{r1}$ and the dead zone gain $k_{r2}$ in the rear drive system $S_r$ can also be obtained according to the following equations (34) and (35) by calculation logic similar to that for obtaining the normal gain $k_{f1}$ and the dead zone gain $k_{f2}$ in the front drive system $S_f$.

[Math. 34]

$$k_{r1} = 2(1-\zeta_{pr})\omega_{pr}K_{dr}/g_{tr} \quad (34)$$

[Math. 35]

$$k_{r2} = 2(\zeta_{yr}-\zeta_{pr})\omega_{pr}K_{dr}/g_{tr} \quad (35)$$

Note that in the equation (35), "$\zeta_{yr}$" represents an attenuation coefficient of a model response in the rear dead zone section (hereinafter, also referred to as "rear dead zone attenuation coefficient $\zeta_{yr}$").

Further, the rear drive shaft torque $T_{dr}$ in which the dead zone model simulating the gear backlash characteristics in the rear drive system $S_r$ is taken into consideration can be expressed by the following equation (36) by the same calculation logic as that for the front drive system $S_f$.

[Math. 36]

$$T_{dr} = \begin{cases} K_{dr}(\theta_{dr} - \theta_{deadr}/2) & (\theta_{dr} \geq \theta_{deadr}/2) \\ 0 & (-\theta_{deadr}/2 < \theta_{dr} < \theta_{deadr}/2) \\ K_{dr}(\theta_{dr} + \theta_{deadr}/2) & (\theta_{dr} \leq -\theta_{deadr}/2) \end{cases} \quad (36)$$

Note that the dead zone models of the front drive system $S_f$ and the rear drive system $S_r$ shown in the above equations (33) and (36) are implemented by a dead zone block $B_{df}$ shown in FIG. 6 and a dead zone block $B_{dr}$ shown in FIG. 7, respectively.

Next, a specific method for determining the dead zone gains $k_{f2}$ and $k_{r2}$ shown in the equation (32) will be described.

In the present embodiment, while the drive systems $S_f$ and $S_r$ in which the torque response of the electric vehicle 100 becomes faster when the total driving force is distributed is used as a reference, the dead zone gains $k_{f2}$ and $k_{r2}$ that change according to the driving force distribution are determined. A more specific description will be given.

Figure 9:
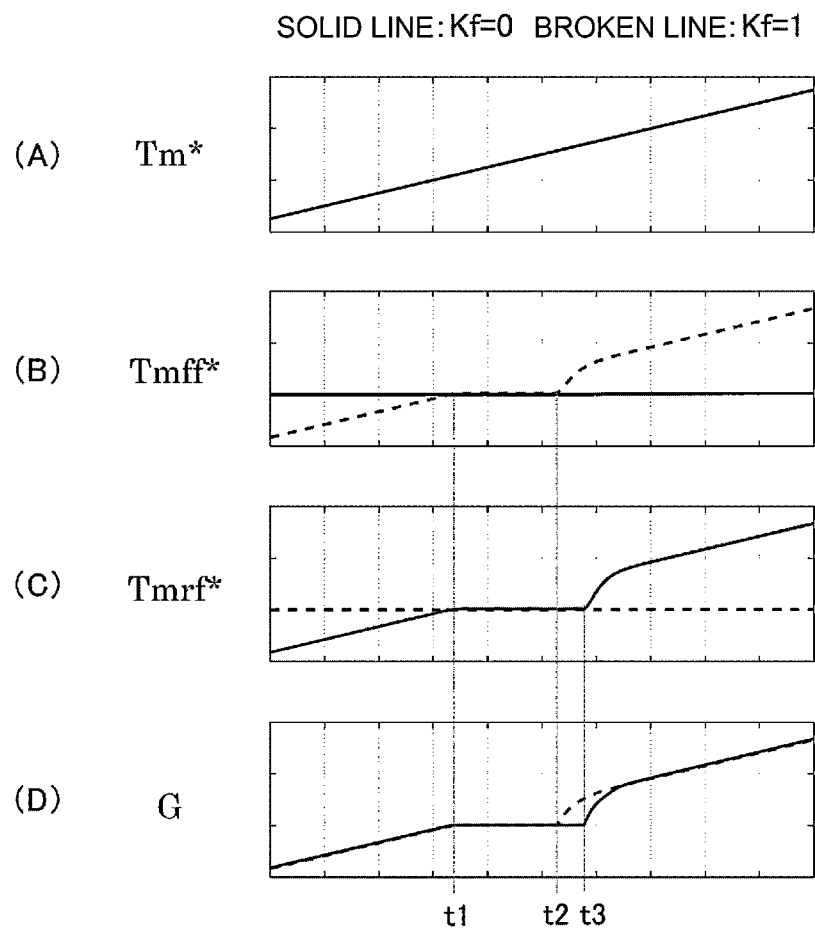
FIG. 9 is a diagram showing torque response characteristics of the electric vehicle.

FIG. 9 is a diagram illustrating the torque response characteristics of the electric vehicle 100 of the present embodiment. Especially, in FIG. 9, the change with time of each parameter when the front distribution gain $K_f$ is set to 1 (when the total driving force is distributed to the front drive system $S_f$) is indicated by a solid line, and the change with time of each parameter when the front distribution gain $K_f$ is set to 0 (when the total driving force is distributed to the rear drive system $S_r$) is indicated by a broken line. Especially, (A) of FIG. 9 shows the basic total torque command value $T_m^*$, and (B) of FIG. 9 shows the front final torque command value $T_{mff}^*$, and (C) of FIG. 9 shows the rear final torque command value $T_{mrf}^*$, and (D) of FIG. 9 shows a longitudinal acceleration G of the electric vehicle 100.

First, when the total driving force is distributed to the front drive system $S_f$ in a scene in which a deceleration state (longitudinal acceleration G<0) is changed to an acceleration state (longitudinal acceleration G>0), the front drive system $S_f$ enters the dead zone section at a time t1 and leaves the dead zone section at a time t2 thereafter, and then a torque response occurs. On the other hand, when the total driving force is distributed to the rear drive system $S_r$ in the same scene, although the rear drive system $S_r$ enters the dead zone section at the same time t1, a torque response occurs at a time t3, which is after the time t2. That is, a stay time (t2−t1) in the dead zone section of the front drive system $S_f$ when the total driving force is distributed to the front drive system $S_f$ ($K_f$=1) is shorter than a stay time (t3−t1) in the dead zone section of the rear drive system $S_r$ when the total driving force is distributed to the rear drive system $S_r$($K_f$=0). It can be said that this is caused by different mechanical characteristics of the front drive system $S_f$ and the rear drive system $S_r$. Therefore, in this case, the dead zone gains $k_{f2}$ and $k_{r2}$ are determined based on the front drive system $S_f$ whose torque response in the dead zone section is faster when the total driving force is distributed thereto.

Hereinafter, a mode of determining the dead zone gains $k_{f2}$ and $k_{r2}$ will be described in detail.

Figure 10:
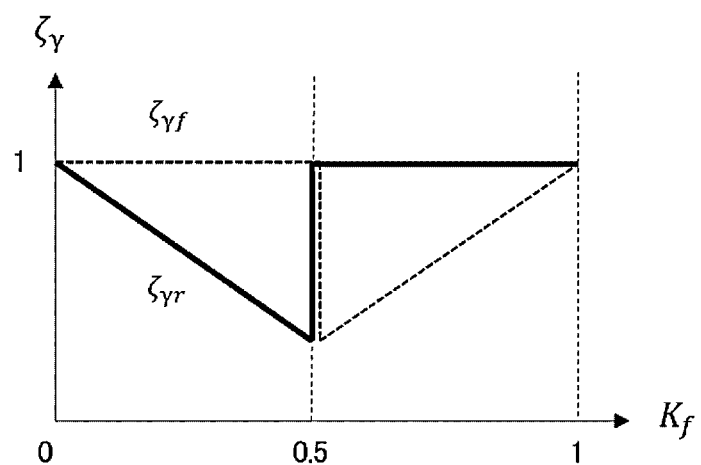
FIG. 10 is a diagram showing a driving force distribution ratio-dead zone attenuation coefficient table.
Figure 11:
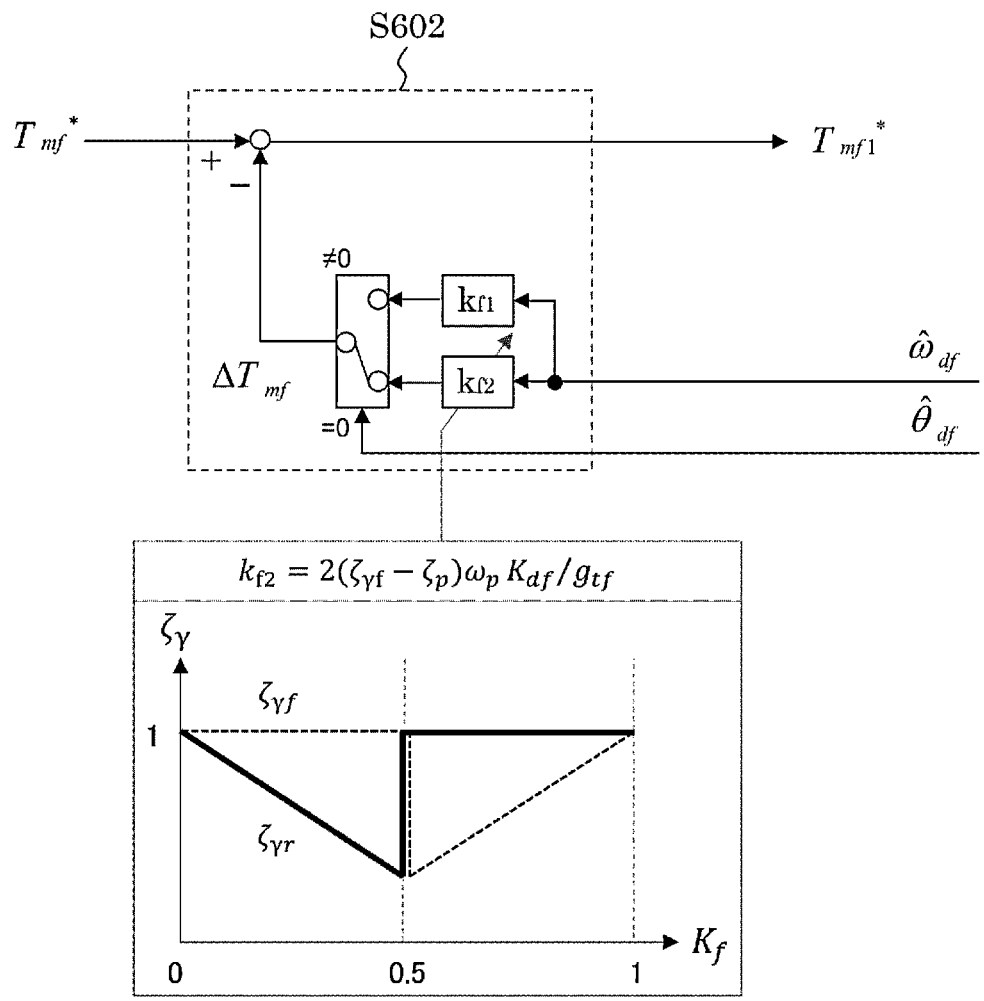
FIG. 11 shows a relation between a front drive shaft torsional angular velocity F/B calculation unit and the driving force distribution ratio-dead zone attenuation coefficient table.

FIG. 10 shows a driving force distribution ratio-dead zone attenuation coefficient table. FIG. 11 shows a relation between the front torque correction unit S602 and the driving force distribution ratio-dead zone attenuation coefficient table.

As shown in FIG. 10, the front dead zone attenuation coefficient vr indicated by the broken line is set to 1, which is the same as the attenuation coefficient (hereinafter, also simply referred to as "reference attenuation coefficient") of the model response in the normal section, when the total driving force is distributed to the front drive system $S_f$($K_f$=1). Therefore, according to the equation (32) shown in FIG. 11, the front dead zone gain $k_{f2}$ is the same as the front normal gain $k_{f1}$ (equation (31)). That is, in this case, the electric vehicle 100 is driven by only the front drive system $S_f$ having a faster torque response. Accordingly, the same torque response performance as in the case where only the front drive system $S_f$ is mounted on the electric vehicle 100 is ensured.

In a region where the driving force is distributed to both the front drive system $S_f$ and the rear drive system $S_r$ but the driving force distributed to the front drive system $S_f$ is relatively large (0.5<$K_f$<1), the front dead zone attenuation coefficient $\zeta_{yf}$ is set to be smaller in accordance with the decrease in the front distribution gain $K_f$ so that the torque response performance during the total driving force distribution ($K_f$=1) is maintained even when the front distribution gain $K_f$ is reduced with the reference attenuation coefficient as a base point. On the other hand, the rear dead zone attenuation coefficient $\zeta_{yr}$ in the rear drive system $S_r$ is maintained at the reference attenuation coefficient. Accordingly, it is possible to reduce the variation in the torque response characteristic caused by the change in the driving force distribution of the front drive system $S_f$ and to further improve the torque response performance of the electric vehicle 100.

Further, in a region where the driving force distributed to the rear drive system $S_r$ is larger than that distributed to the front drive system $S_f$(0<$K_f$<0.5), the front dead zone attenuation coefficient $\zeta_{yr}$ is maintained at the reference attenuation coefficient. On the other hand, the rear dead zone attenuation coefficient $\zeta_{yr}$ is set to be smaller in accordance with an increase in the front distribution gain $K_f$ (a decrease in the driving force distributed to the rear drive system $S_r$) by a reduction profile similar to that for the front dead zone gain $k_{f2}$ in the region of $0.5<K_f<1$ based on the total driving force distribution ($K_f=0$) with the fastest torque response in the rear drive system $S_r$. That is, in this case, the torque response performance of the rear drive system $S_r$ is maintained in a state close to that in the total driving force distribution ($K_f=0$) regardless of the drive system distribution. Accordingly, it is possible to reduce the variation in the torque response characteristic caused by the change in the driving force distribution of the rear drive system $S_r$ and to further improve the torque response performance of the electric vehicle 100.

Note that the above description is also applicable to a case where the torque response in the dead zone section of the rear drive system $S_r$ when the total driving force is distributed thereto is higher than that in the front drive system $S_f$, and the dead zone gains $k_{f2}$ and $k_{r2}$ are determined based on the rear drive system $S_r$.

As described above, in the present embodiment, the dead zone gain $k_{f2}$ or $k_{r2}$ of the drive system $S_f$ or $S_r$ to which a larger driving force is distributed is set to be smaller than the normal gains $k_{r1}$ and $k_{r1}$. Therefore, the vibration compensation torque $\Delta T_m$ ($=k_f \times \omega_d$) of the drive system $S_f$ or $S_r$ to which a larger driving force is distributed decreases, and the torque response performance of the electric vehicle 100 in the dead zone section (followability of the actual driving force to the total required driving force) increases. Since the dead zone gains $k_{f2}$ and $k_{r2}$ are determined based on the front drive system $S_f$ showing a faster torque response when the total driving force is distributed thereto, regardless of the difference in the mechanical characteristics between the drive systems $S_f$ and $S_r$, the torque response characteristic of the electric vehicle 100 in the dead zone section can be made close to the characteristic in the case where only the front drive system $S_f$ is used as the drive source, which shows the highest torque response characteristic.

Next, the F/B compensators S502 and S504 will be described in detail.

Figure 12:
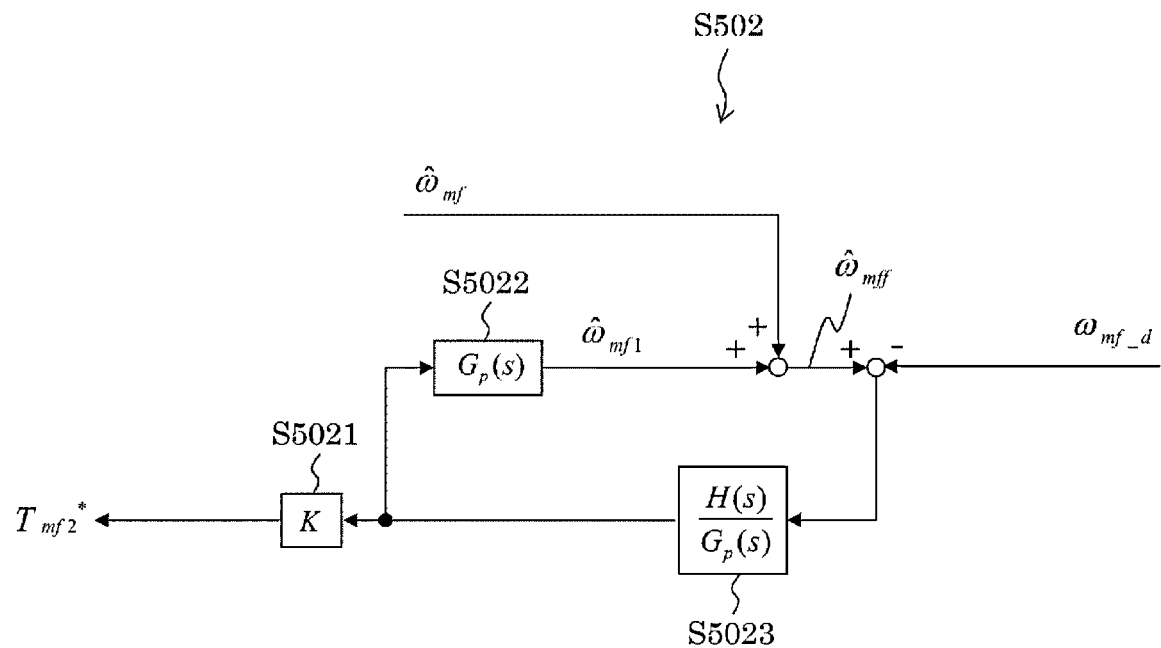
FIG. 12 is a block diagram illustrating an F/B compensator of the front drive system according to the first embodiment.
Figure 13:
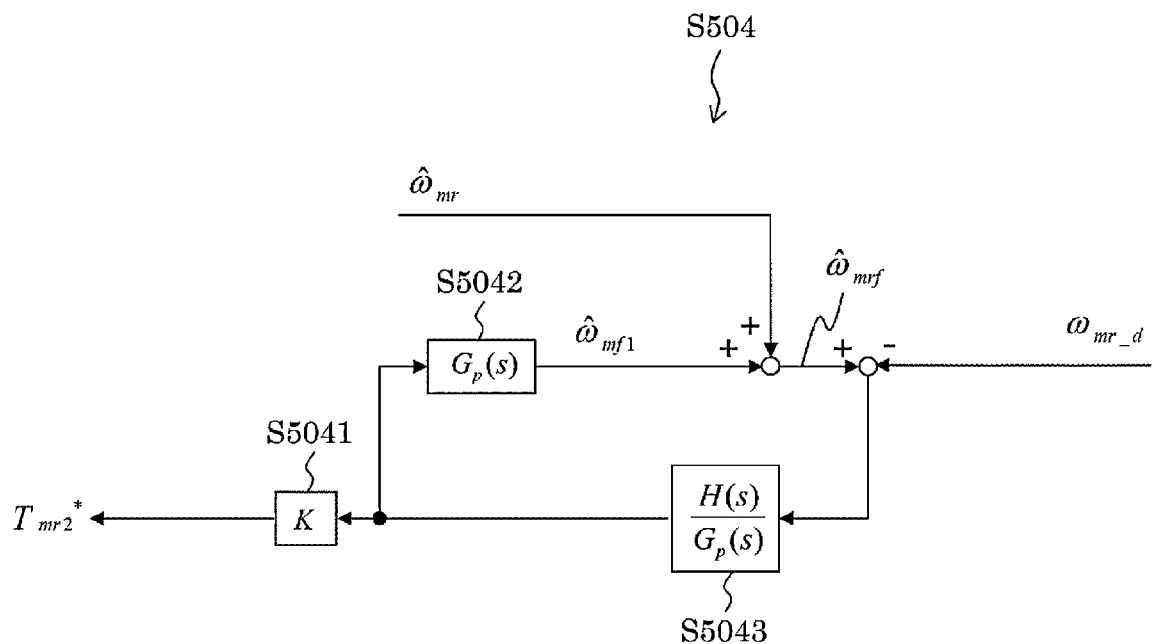
FIG. 13 is a block diagram illustrating an F/B compensator of the rear drive system according to the first embodiment.

FIGS. 12 and 13 are block diagrams showing configurations of the F/B compensators S502 and S504. Specially, FIG. 12 shows the configuration of the front F/B compensator S502, and FIG. 13 shows the configuration of the rear F/B compensator S504.

As shown in the drawings, the F/B compensator S502, S504 includes a gain unit S5021, S5041, a filter unit S5022, S5042, and a filter unit S5023, S5043.

The gain K used in the gain unit S5021, S5041 is set to adjust stability margin (gain margin, phase margin) of a feedback control system, and is set to a value of 1 or less.

The filter unit S5022, S5042 is a filter having a transmission characteristic Gp(s) that simulates the transmission characteristic from the motor torque $T_{mf}$, $T_{mr}$ to the motor rotation angular velocity $\omega_{mf}$, $\omega_{mr}$. Note that the transmission characteristic Gp(s) is determined by, for example, the above equation (13).

The filter unit S5023, S5043 is a filter of H(s)/Gp(s) including an inverse system of the transmission characteristic Gp(s) and a band-pass filter H(s). The band-pass filter H (s) is set such that attenuation characteristics on a low-pass side and a high-pass side substantially coincide with each other, and a torsional resonance frequency $f_p$ of the drive system is in the vicinity of a central portion of a passband on a logarithmic axis (log scale).

For example, when the band-pass filter H(s) includes a first-order high-pass filter and a first-order low-pass filter, the band-pass filter H(s) is configured as in the following equation (37).

[Math. 37]

$$H(s) = \frac{\tau_H s}{(1+\tau_H s) \cdot (1+\tau_L s)} \quad (37)$$

Here, $\tau_L = 1/(2\pi f_{HC})$, $f_{HC} = k \cdot f_p$, $\tau_H = 1/(2\pi f_{LC})$, and $f_{LC} = f_p/k$. Note that the frequency $f_p$ is a torsional resonance frequency of the drive systems $S_f$ and $S_r$, and k is any value constituting the band pass.

Therefore, the F/B compensator S502, S504 adds the motor rotation angular velocity estimation value $\hat{\omega}_{mf}$, $\hat{\omega}_{mr}$ based on the first torque command value $T_{mf1}^*$, $T_{mr1}^*$ calculated by the vehicle model S601, S701 of the F/F compensator S501, S503 and the motor rotation angular velocity estimation value $\hat{\omega}_{mf1}$, $\hat{\omega}_{mr1}$ calculated by inputting a second torque command value $T_{mf2}^*$, $T_{mr2}^*$ before being multiplied by the gain K to the transmission characteristic Gp(s), to calculate a final motor rotation angular velocity estimated value $\hat{\omega}_{mff}$ and $\hat{\omega}_{mrf}$. Further, the F/B compensator S502, S504 calculates a deviation between the final motor rotation angular velocity estimated value $\hat{\omega}_{mff}$, $\hat{\omega}_{mrf}$ and a motor rotation angular velocity detection value $\omega_{mf\_d}$, $\omega_{mr\_d}$ obtained by the rotation sensor 21, and applies the filter H(s)/Gp(s) to the deviation and multiply the result by a gain K to obtain the second torque command value $T_{mf2}^*$, $T_{mr2}^*$.

Then, as shown in FIG. 5, in the vibration damping processing S203, the final torque command value $T_{mff}^*$, $T_{mrf}^*$ is calculated as the sum of the first torque command value $T_{mf1}^*$, $T_{mr1}^*$ output from the F/F compensator S501, S503 and the second torque command value $T_{mf2}^*$, $T_{mr2}^*$ output from the F/B compensator S502, S504.

By calculating the final torque command value $T_{mff}^*$, $T_{mrf}^*$ in this way, after the vibration compensation (feed-forward compensation) by the F/F compensator S501, S503, the first torque command value $T_{mf1}^*$, $T_{mr1}^*$ is further subjected to vibration compensation (feedback compensation) by the F/B compensator S502, S504, and then, the final torque command value $T_{mff}^*$, $T_{mrf}^*$ is determined. As a result, it is possible to more reliably reduce the vibration of the driving force transmission system in each of the drive systems $S_f$ and $S_r$.

The configurations of the present embodiment described above and the functions and effects thereof will be described collectively.

In the present embodiment, there is provided an electric vehicle control method for controlling the driving force of each of the drive systems $S_f$ and $S_r$ in the electric vehicle 100 equipped with the drive systems $S_f$ and $S_r$ including the drive motors 4f and 4r respectively.

The electric vehicle control method includes: the basic torque distribution processing S202 of determining the basic torque command value $T_{mf}^*$, $T_{mr}^*$ for each of the drive motors 4f and 4r based on the total required driving force (basic total torque command value $T_m^*$) for the electric vehicle 100 and driving force distribution ($K_f$ or $1-K_f$) for each of the drive systems $S_f$ and $S_r$; the vibration damping processing S203 of obtaining a corrected torque command value (first torque command value $T_{mf1}^*$, $T_{mr1}^*$ or final torque command value $T_{mff}^*$, $T_{mrf}^*$) by performing correction for reducing vibration of the driving force transmission system on each basic torque command value $T_{mf}^*$, $T_{mr}^*$; and driving force control processing (S204, S205) of controlling the driving force (motor torque $T_{mf}$, $T_{mr}$) generated by each of the drive motors 4f and 4r based on the corrected torque command value (more specifically, the final torque command value $T_{mff}^*$, $T_{mrf}^*$).

The vibration damping processing S203 includes estimating whether each of the drive systems $S_f$ and $S_r$ is in a dead zone section individually, and adjusting a correction amount (vibration compensation torque $\Delta T_{mf}$, $\Delta T_{mr}$) for the basic torque command value $T_{mf}^*$, $T_{mr}^*$ of the drive system $S_f$, $S_r$ in the dead zone section according to the driving force distribution (see FIG. 11).

As a result, vibration compensation is performed on each basic torque command value $T_{mf}^*$, $T_{mr}^*$, taking into account the variation in the torque response characteristic in the dead zone section due to the difference in the driving force distribution, and the final torque command value $T_{mff}^*$, $T_{mrf}^*$ can be determined. Accordingly, in the electric vehicle 100 equipped with the drive systems $S_f$ and $S_r$, a control configuration in which the sense of discomfort of the occupant is reduced while maintaining the vibration damping function.

Specifically, in the vibration damping processing S203, the vibration compensation torque $\Delta T_{mf}$, $\Delta T_{mr}$ is obtained by multiplying the torsional angular velocity estimation value $\hat{\omega}_{df}$, $\hat{\omega}_{dr}$ of the drive shaft Dsf, Dsr in the drive system $S_f$, $S_r$ by a predetermined feedback gain ($k_{f1}$, $k_{f2}$, $k_{r1}$, $k_{r2}$), and the corrected torque command value (first torque command value $T_{mf1}^*$, $T_{mr1}^*$ is obtained by subtracting the vibration compensation torque $\Delta T_{mf1}^*$, $\Delta T_{mr1}^*$ from the basic torque command value $T_{mf}^*$, $T_{mr}^*$ (torque correction unit S602, S702). The feedback gain in the normal section is set to the normal gain $k_{f1}$, $k_{r1}$ that is constant with respect to the change in the driving force distribution, and the feedback gain in the dead zone section is set to the dead zone gain $k_{f2}$, $k_{r2}$ corresponding to the driving force distribution.

Thus, a specific control logic for adjusting the torque response characteristic in the dead zone section for each of the drive systems $S_f$ and $S_r$ is implemented.

Further, in the vibration damping processing S203 in the present embodiment, the dead zone gain $k_{f2}$, $k_{r2}$ is determined so that a timing at which the drive system $S_f$, $S_r$ passes through the dead zone section is substantially constant regardless of the driving force distribution.

Accordingly, it is possible to shorten the time during which the electric vehicle 100 stays in the dead zone (a period during which neither of the drive systems $S_f$ and $S_r$ contributes to the actual output driving force of the electric vehicle 100), and to improve the torque response performance of the electric vehicle 100.

In the vibration damping processing S203 (in particular, the F/F compensator S501, S503), the torsional angular velocity estimation value $\hat{\omega}_{df}$, $\hat{\omega}_{dr}$ of the drive shaft Dsf, Dsr of the drive system $S_f$, $S_r$ is calculated using the vehicle model S601, S701 obtained by modeling the driving force transmission system of the electric vehicle 100.

Accordingly, even when the vibration damping processing is applied to the electric vehicle 100 including the plurality of drive systems $S_f$ and $S_r$, it is possible to determine the vibration compensation torques $\Delta T_{mf}$, $\Delta T_{mr}$ for achieving the preferable vibration damping function in the drive systems $S_f$ and $S_r$ by the feedforward calculation based on the torsional angular velocity estimation value $\hat{\omega}_{df}$, $\hat{\omega}_{dr}$ determined from the model corresponding to the actual electric vehicle 100. Furthermore, in the present embodiment, in the F/B compensator S502, S504, since the feedback vibration compensation torque (the second torque command value $T_{mf2}^*$, $T_{mr2}^*$) is determined by feedback control to match each torsional angular velocity estimation value $\hat{\omega}_{df}$, $\hat{\omega}_{dr}$ based on the vehicle model S601, S701 with each motor rotation angular velocity detection value $\omega_{mf\_d}$, $\omega_{mr\_d}$, even in a configuration in which vibration damping processing is performed for the plurality of drive systems $S_f$ and $S_r$, excess vibration damping compensation can be appropriately removed from each torque command value (first torque command value $T_{mf1}^*$, $T_{mr1}^*$) after feedforward compensation in the F/F compensator S501, S503, thereby ensuring the accuracy of the vibration compensation.

In the vibration damping processing S203 (in particular, the F/F compensator S501, S503), the torsional angle estimation value $\hat{\theta}_{df}$, $\hat{\theta}_{dr}$ of the drive shaft Dsf, Dsr in the drive system $S_f$, $S_r$ is further obtained using the vehicle model S601, S701.

In this way, by using the same vehicle model S601, S701, it is possible to determine the torsional angular velocity estimation value $\hat{\omega}_{df}$, $\hat{\omega}_{dr}$ used for calculating the vibration compensation torque $\Delta T_{mf}$, $\Delta T_{mr}$ and the torsional angle estimation value $\hat{\theta}_{df}$, $\hat{\theta}_{dr}$ used for estimating the dead zone section. That is, the parameters used for the calculation of the vibration compensation torque $\Delta T_{mf}$, $\Delta T_{mr}$ and the estimation of the dead zone section can be determined by the same vehicle model S601, S701, and therefore, the control logic can be simplified and the computation load can be reduced.

Further, in the present embodiment, in the drive system $S_f$, $S_r$, the dead zone gain $k_{f2}$, $k_{r2}$ of the drive system $S_f$, $S_r$ to which a relatively large driving force is distributed is made smaller than the normal gain $k_{f1}$, $k_{r1}$ that is set when the drive system $S_f$, $S_r$ is in a section other than the dead zone section.

Accordingly, the stay time in the dead zone section of the drive system $S_f$, $S_r$ to which a relatively large driving force is distributed is further shortened, and thus the torque response of the electric vehicle 100 can be further accelerated. Especially, even in a scene in which the other drive system is in the dead zone section, the drive system $S_f$, $S_r$ having a larger distributed driving force can quickly leave the dead zone section and output a driving force closer to the total required driving force of the electric vehicle 100. That is, in this scene, the same characteristics as in a case where the electric vehicle 100 is independently driven by the drive system $S_f$, $S_r$ having a larger distributed driving force can be obtained.

In the present embodiment, the dead zone gain $k_{f2}$, $k_{r2}$ of the drive system $S_f$, $S_r$ is set such that the dead zone gain $k_{f2}$ of one of the drive systems (for example, the front drive system $S_f$) having a characteristic that the dead zone section is the shortest when all the driving force is distributed thereto is smaller than the normal gain $k_{f1}$ that is set when the drive system $S_f$ is in a section other than the dead zone section.

Accordingly, a torque response timing of the electric vehicle 100 in the dead zone section can be matched with a backlash crossing timing of the front drive system $S_f$ having a short dead zone section in terms of mechanical characteristics. That is, the torque response of the electric vehicle 100 can be further accelerated.

Note that in the present embodiment, in addition to the above-described electric vehicle control method, an electric motor controller 2 that functions as an electric vehicle control device for executing the above-described electric vehicle control method is provided. Specifically, the electric motor controller 2 includes: a basic torque distribution unit (S202) for determining the basic torque command value $T_{mf}^*$, $T_{mr}^*$ for each of the drive motors 4f and 4r based on the total required driving force (basic total torque command value $T_m^*$) for the electric vehicle 100 and driving force distribution ($K_f$ or $1-K_f$) for each of the drive systems $S_f$ and $S_r$; the vibration damping unit (S203) for obtaining a corrected torque command value (first torque command value $T_{mf1}^*$, $T_{mr1}^*$ or final torque command value $T_{mff}^*$, $T_{mrf}^*$) by performing correction for reducing vibration of the driving force transmission system on each basic torque command value $T_{mf}^*$, $T_{mr}^*$; and a driving force control unit (S204, S205) for controlling the driving force (motor torque $T_{mf}$, $T_{mr}$) generated by each of the drive motors 4f and 4r based on the corrected torque command value (more specifically, the final torque command value $T_{mff}^*$, $T_{mrf}^*$). The vibration damping unit (S203) also estimates whether each of the drive systems $S_f$ and $S_r$ is in a dead zone section individually, and adjusts a correction amount (vibration compensation torque $\Delta T_{mf}$, $\Delta T_{mr}$) for the basic torque command value $T_{mf}^*$, $T_{mr}^*$ of the drive system $S_f$, $S_r$ in the dead zone section according to the driving force distribution (see FIG. 11).

Second Embodiment

Hereinafter, a second embodiment will be described. Note that the same elements as those in the first embodiment are denoted by the same reference numerals, and the description thereof will be omitted.

Figure 14:
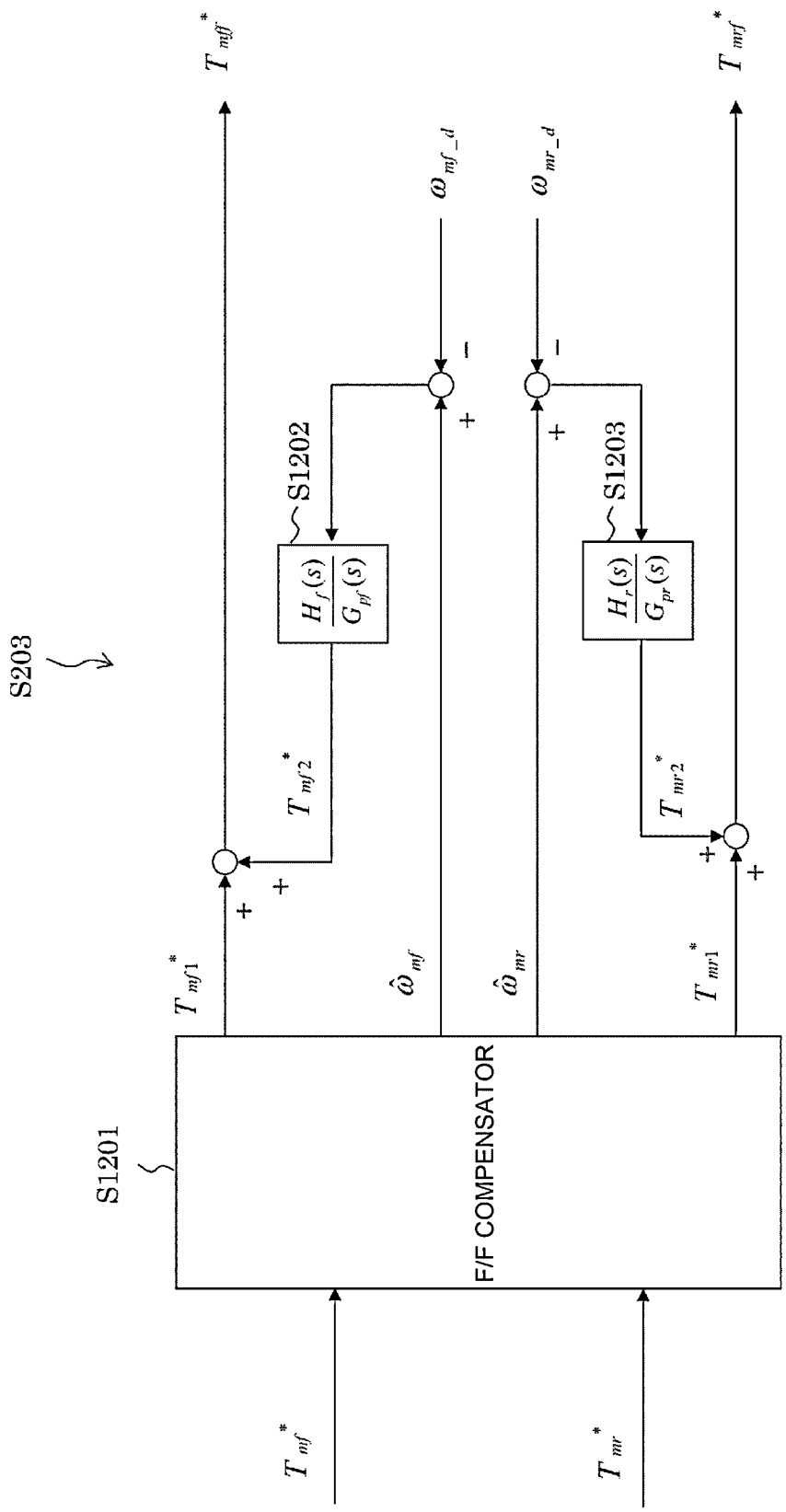
FIG. 14 is a block diagram illustrating vibration damping processing according to a second embodiment.

FIG. 14 is a block diagram illustrating the vibration damping processing S203 of the present embodiment. Especially, in the present embodiment, an F/F compensator S1201 is used instead of the F/F compensator S501, S503 of the first embodiment.

Figure 15:
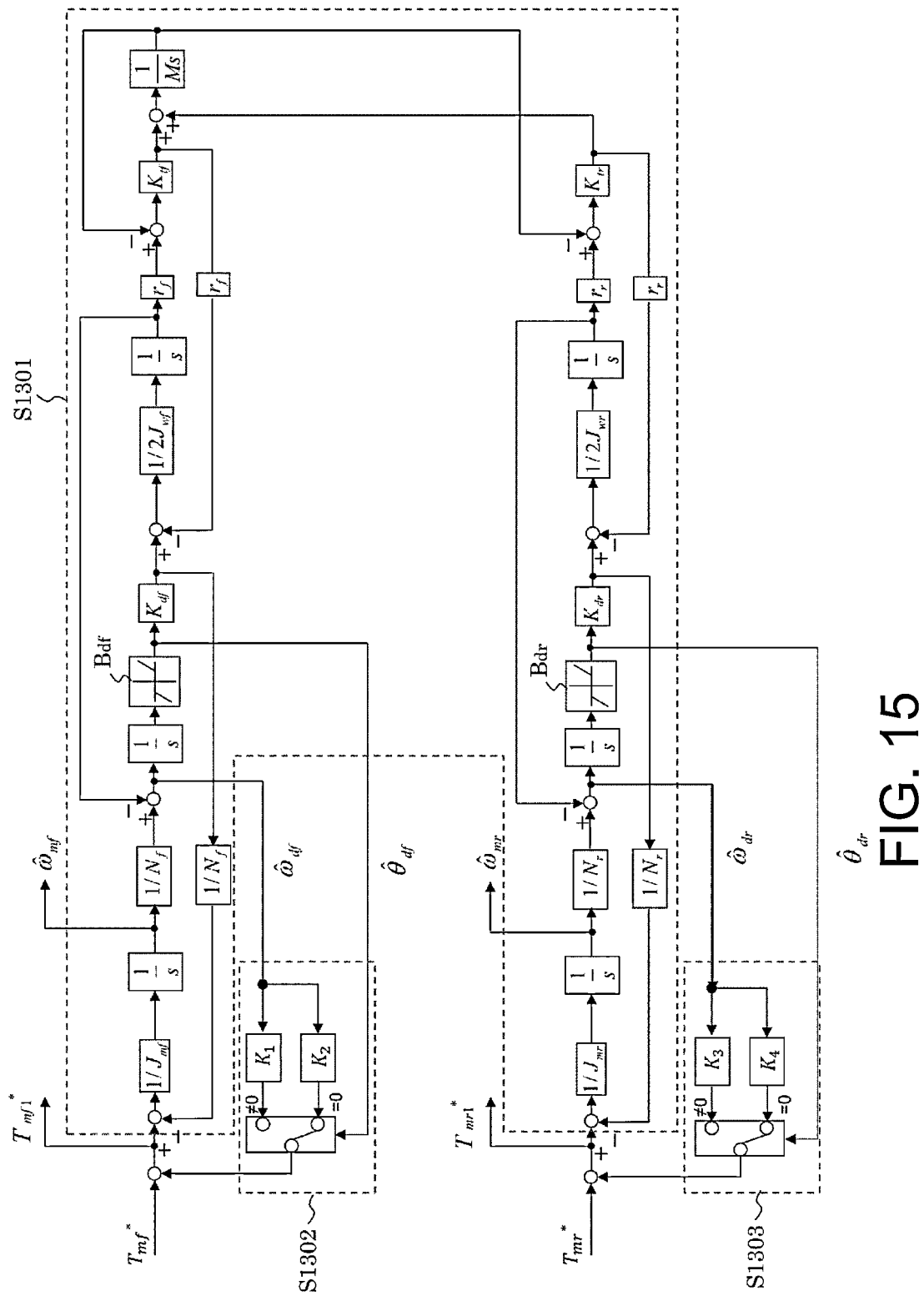
FIG. 15 is a block diagram illustrating a configuration of an F/F compensator according to the second embodiment.

FIG. 15 is a block diagram illustrating a configuration of the F/F compensator S1201. As shown in the drawing, the F/F compensator S1201 includes a vehicle model S1301 including dead zone models simulating driving force characteristics of the front drive system $S_f$ and the rear drive system $S_r$, a front torque correction unit S1302 for obtaining the front first torque command value $T_{mf1}^*$ from the front basic torque command value $T_{mf}^*$ and the front torsional angular velocity estimation value $\hat{\omega}_{df}$, and a rear torque correction unit S1303 for obtaining the rear first torque command value $T_{mr1}^*$ from the rear basic torque command value $T_{mr}^*$ and the rear torsional angular velocity estimation value $\hat{\omega}_{dr}$.

Note that the normal gain $k_{f1}$ and the dead zone gain $k_{f2}$ in the front drive system $S_f$ can be determined by the equations (31) and (32), respectively, as in the first embodiment. The normal gain $k_{r1}$ and the dead zone gain $k_{r2}$ in the rear drive system $S_r$ can be determined by the equations (34) and (35), respectively, as in the first embodiment.

Further, the backlash characteristic of the gear from the drive motor 4f, 4r to the drive shaft Dsf, Dsr in the drive system $S_f$, $S_r$ can be determined from the equations (33) and (36), respectively, as in the first embodiment.

Returning to FIG. 14, the vibration damping processing S203 includes a F/B compensator S1202, S1203 instead of the F/B compensator S502, S504 of the first embodiment.

Here, the F/B compensator S1202 subtracts the front motor rotation angular velocity detection value $\omega_{mf\_d}$ from the front motor rotation angular velocity estimation value $\hat{\omega}_{mf}$, and multiplies the result by the inverse model of the band-pass filter $H_f(s)$ and the front vehicle model $G_{pf}(s)$ to obtain the second front torque command value $T_{mf2}^*$. Further, the F/B compensator S1202 adds the second front torque command value $T_{mf2}^*$ to the front first torque command value $T_{mf1}^*$ to obtain the front final torque command value $T_{mff}^*$.

On the other hand, the F/B compensator S1203 subtracts the rear motor rotation angular velocity detection value $\omega_{mr\_d}$ from the rear motor rotation angular velocity estimation value $\hat{\omega}_{mr}$, and multiplies the result by the inverse model of the band-pass filter $H_r(s)$ and the vehicle model $G_{pr}(s)$ to obtain the second rear torque command value $T_{mr2}^*$. Further, the F/B compensator S1203 adds the second rear torque command value $T_{mr2}^*$ to the rear first torque command value $T_{mr1}^*$ to obtain the rear final torque command value $T_{mrf}^*$.

The electric vehicle control method according to the present embodiment also achieves the same effects as those of the first embodiment.

Control Result of Present Embodiment

Figure 16:
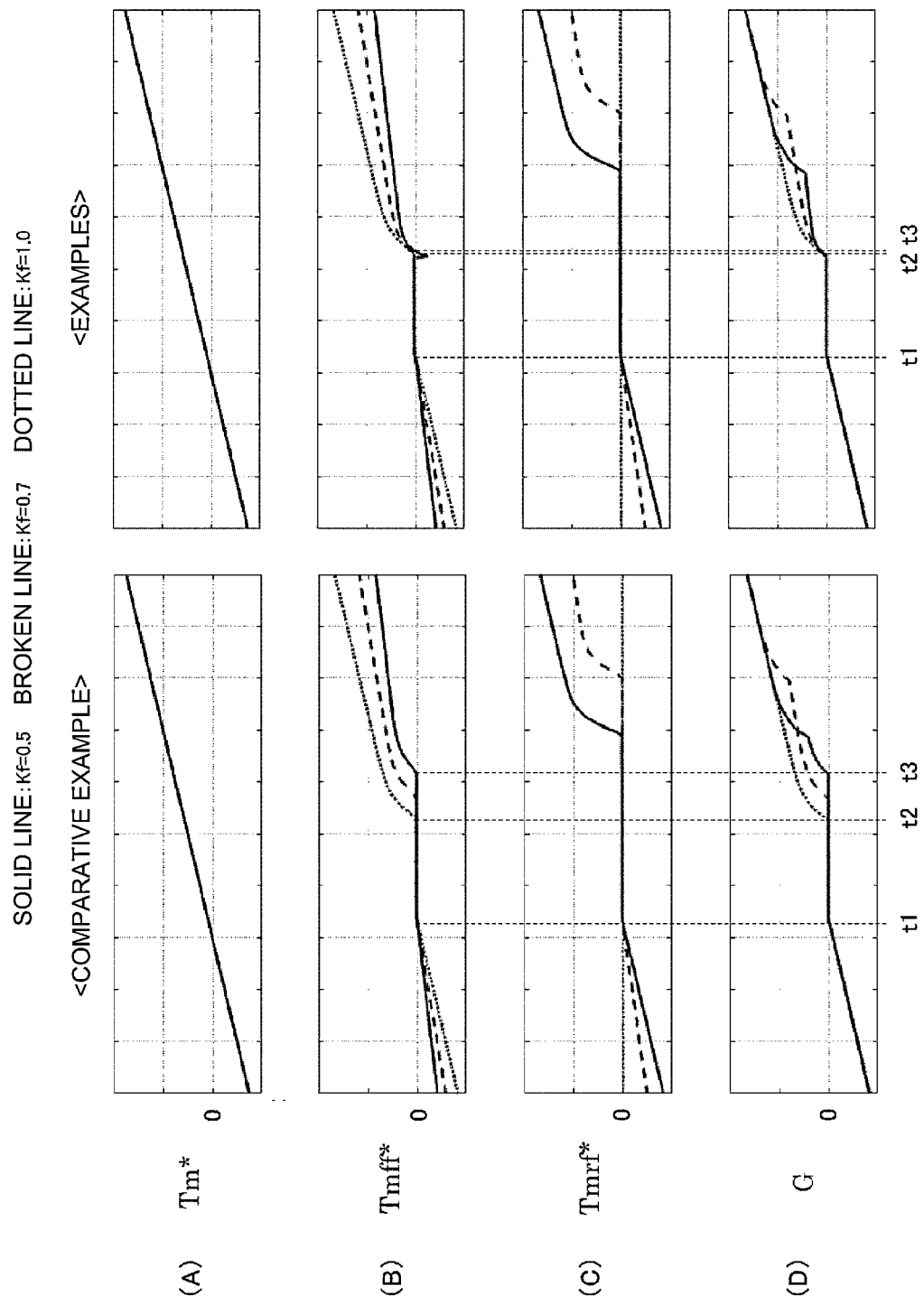
FIG. 16 is a time chart illustrating a control result according to the electric vehicle control method of each embodiment.

FIG. 16 is a diagram showing comparison between the control results according to the first embodiment and the second embodiment (examples) and control results according to a reference example. The basic total torque command value $T_m^*$, the front final torque command value $T_{mff}^*$, the rear final torque command value $T_{mrf}^*$, and the longitudinal acceleration G are shown in order from the top in the drawing. Note that a solid line, a broken line, and a dotted line in the drawing indicate control results when the front distribution gain $K_f$ is 0.5, 0.7, and 1.0, respectively.

FIG. 16 shows control results in a scene in which the basic total torque command value $T_m^*$ is increased at a gentle slope and the vehicle accelerates from a state in which the vehicle is decelerated by a regenerative torque. Note that in the reference example, feedback gains for determining the vibration compensation torques $\Delta T_{mf}$ and $\Delta T_{mr}$ are set without depending on the driving force distribution while providing a difference in mechanical characteristics between the front and rear drive systems. On the other hand, in the examples, the dead zone gain (in particular, the front dead zone gain $k_{f2}$) is set by the method described in the above embodiments while the difference in the mechanical characteristics between the front and rear drive systems is the same as that in the reference example.

In the reference example, after the longitudinal acceleration G becomes 0 at the time t1 and the vehicle suddenly enters the dead zone section, even in the same drive system (the front drive system $S_f$ in the drawing), the variation in the time (times t2 to t3) in which the vehicle stays in the dead zone according to the driving force distribution is large. Further, even if the driving force distribution is the same, the time for staying in the dead zone is different due to the difference in mechanical characteristics between the front and rear drive systems.

In contrast, referring to the control results (solid lines) of the examples, regardless of the driving force distribution in the front drive system $S_f$, the torque response timing approaches the timing (time t2) when the total driving force is distributed ($K_f=1.0$). As a result, the variation in the time (times t2 to t3) for staying in the dead zone section is eliminated. This is because the dead zone section is estimated for each of the front and rear drive systems, and in the dead zone section, the feedback gain to be multiplied by the torsional angular velocity $\hat{\omega}_{df}$, $\hat{\omega}_{dr}$ is reduced. Especially, since the dead zone gain $k_{f2}$ is determined based on the front drive system $S_f$ having a short dead zone section in terms of the mechanical characteristics thereof, the torque response timing (time t2) when the total driving force is distributed thereto is also advanced, and thus the time during which the electric vehicle 100 stays in the dead zone is further shortened.

Modifications

Figure 17:
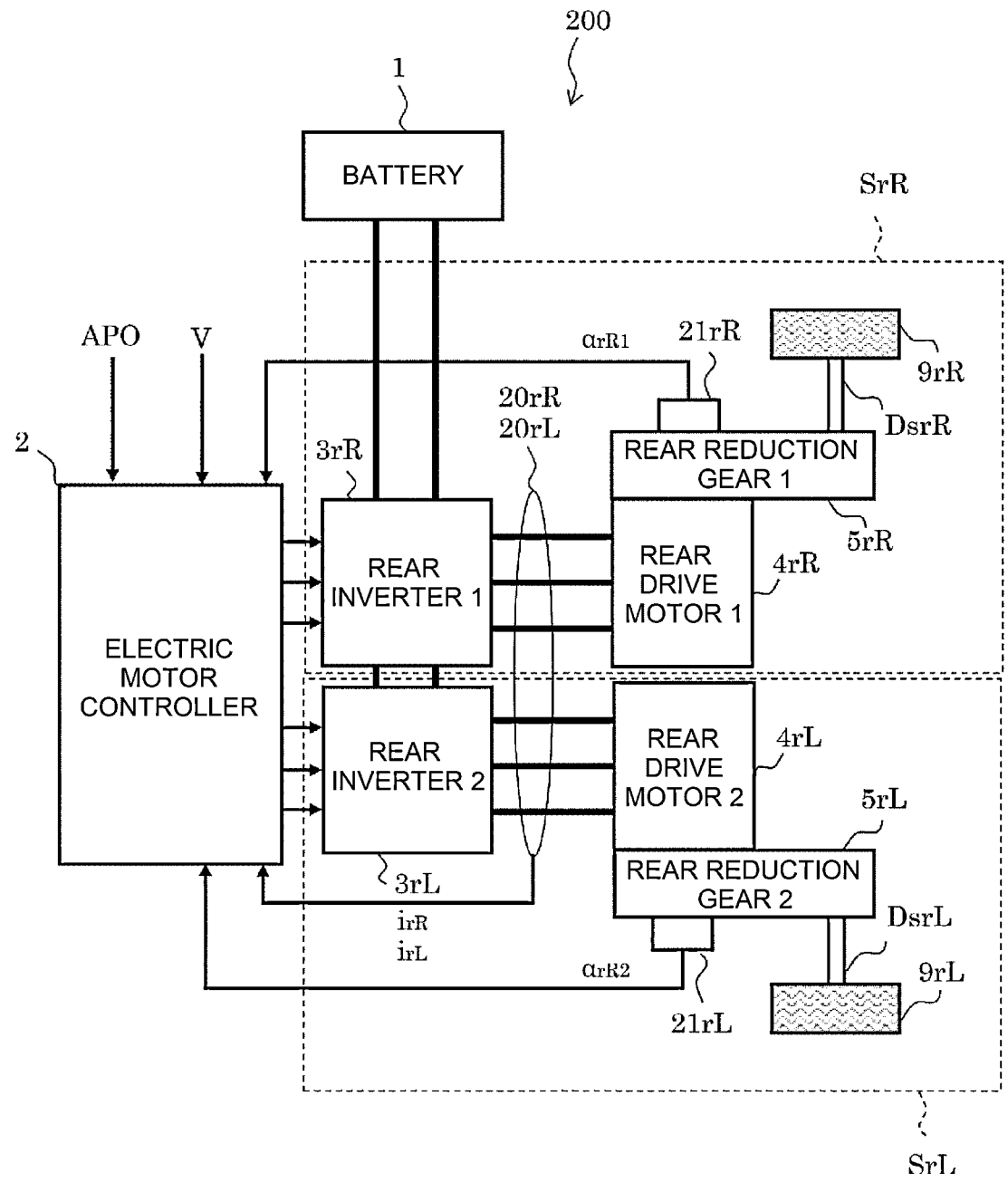
FIG. 17 is a diagram showing a modification of the configuration of the electric vehicle.
Figure 18:
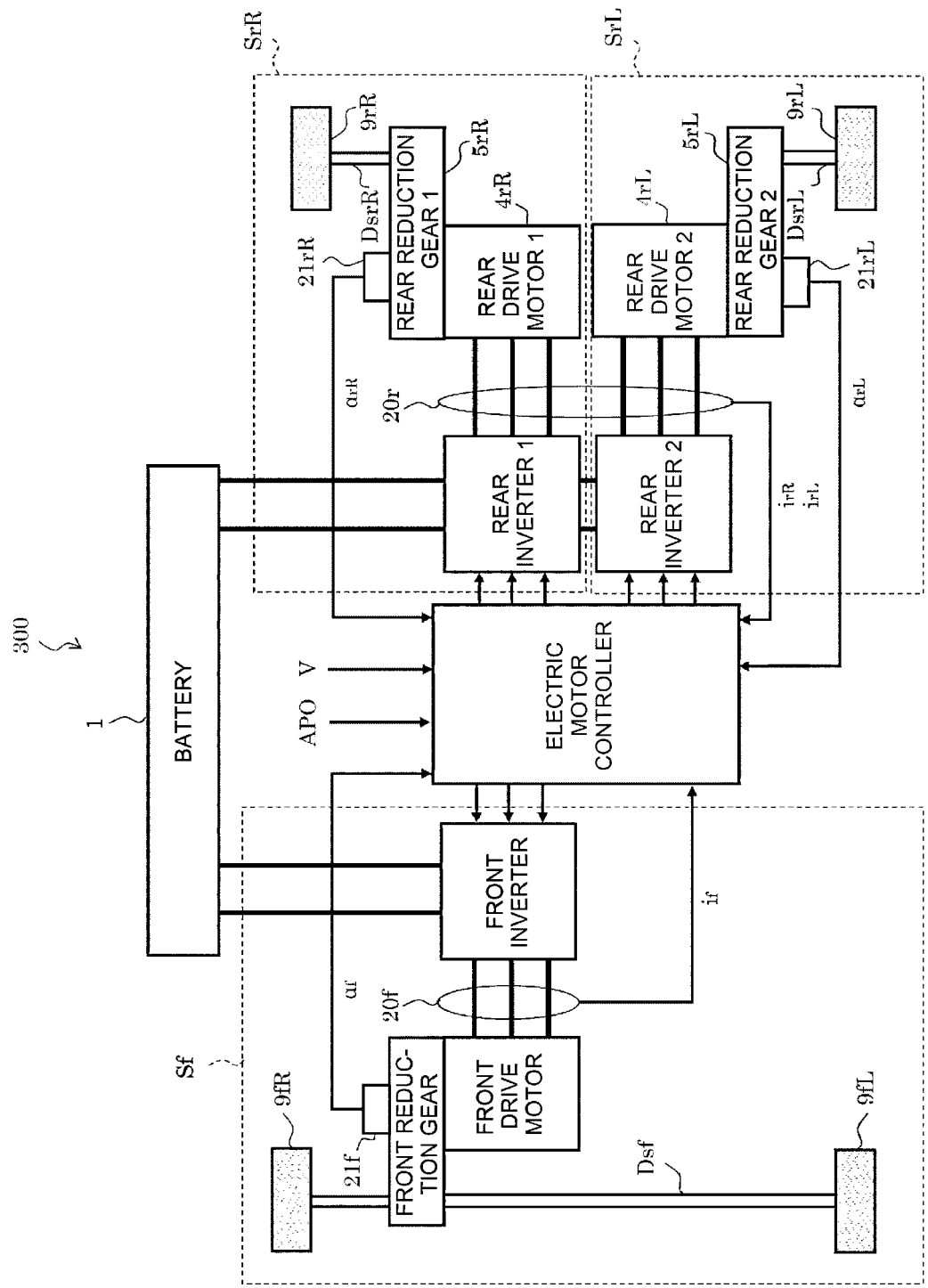
FIG. 18 is a diagram showing a modification of the configuration of the electric vehicle.
Figure 19:
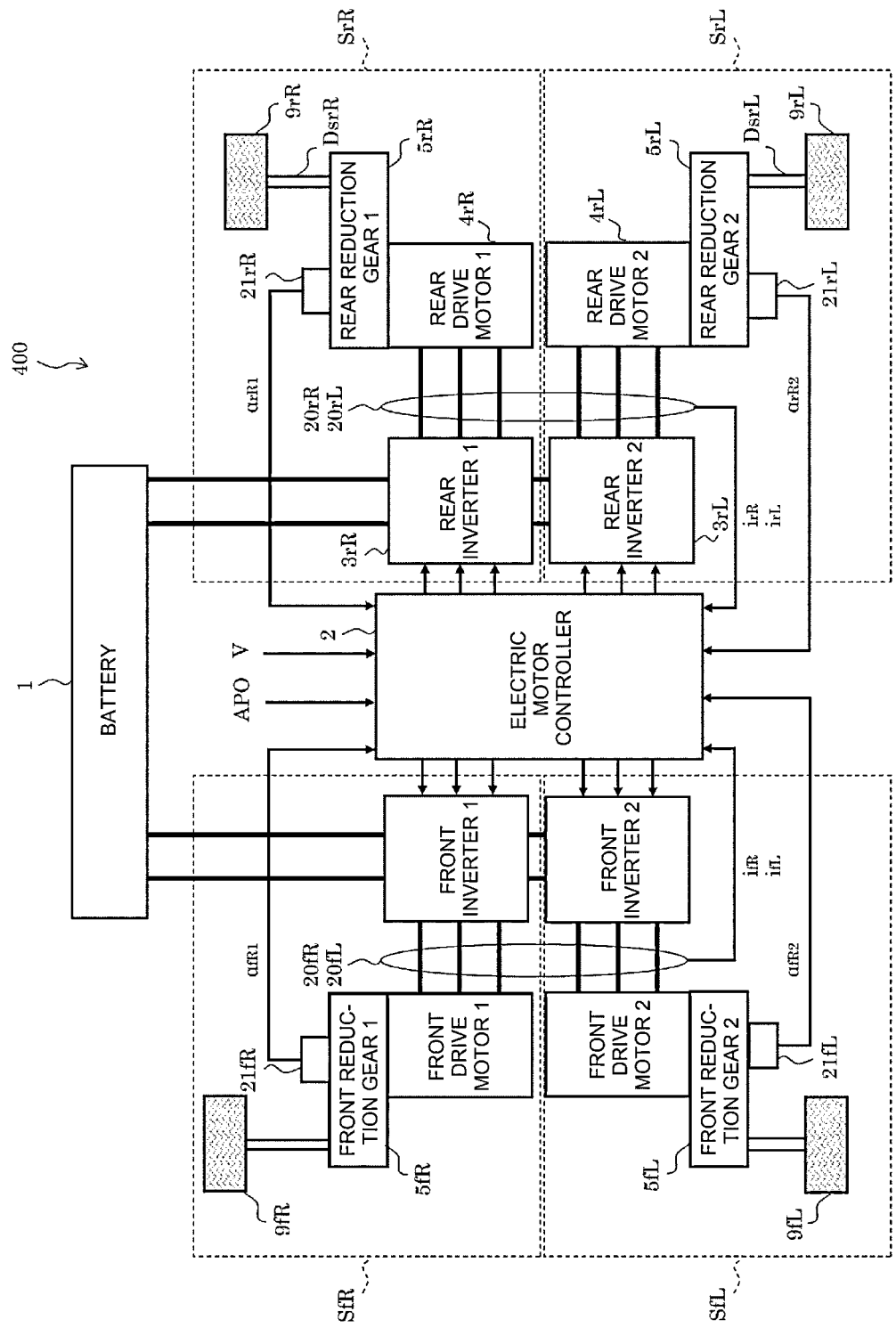
FIG. 19 is a diagram showing a modification of the configuration of the electric vehicle.

The control logic according to the electric vehicle control method described in each of the above embodiments can be applied to each vehicle having the system configuration shown in FIGS. 17 to 19 by appropriately performing necessary correction.

Specifically, an electric vehicle 200 shown in FIG. 17 does not include a drive system on the front side, but includes a first rear drive system SrR and a second rear drive system SrL.

The first rear drive system SrR includes a first rear drive motor 4rR that drives first rear driving wheels 9rR, and various sensors and actuators for controlling the first rear drive motor 4rR. The second rear drive system SrL includes a second rear drive motor 4rL that drives second rear driving wheels 9rL, and various sensors and actuators for controlling the second rear drive motor 4rL.

The electric vehicle 200 of the present modification can execute the electric vehicle control method according to the present invention by, for example, replacing the respective parameters of the front drive system Sf and the rear drive system Sr in the above embodiment with parameters related to the first rear drive system SrR and the second rear drive system SrL, and making a modification such as setting a suitable vehicle model.

An electric vehicle 300 shown in FIG. 18 includes a front drive system Sf, a first rear drive system SrR, and a second rear drive motor 4rL. That is, in the electric vehicle system 300, the drive motor 4 includes three motors, that is, a front drive motor 4f that drives a front drive shaft Dsf, a first rear drive motor 4rR that drives a first rear driving wheel 9rR, and a second rear drive motor 4rL that drives a second rear driving wheel 9rL.

In the electric vehicle system 300 of the present modification, the electric vehicle control method according to the present invention can be executed by, for example, distributing the parameters set in the rear drive system Sr to the first rear drive system SrR and a second rear drive system SrL while executing the same control method as in the above embodiment.

Further, in an electric vehicle 400 shown in FIG. 19, a front drive system Sf includes a first front drive system SfR provided with various sensors and actuators for controlling a first front drive motor 4fR that drives a first front driving wheel 9fR, and a second front drive system SfL provided with various sensors and actuators for controlling a second front drive motor 4fL that drives a second front driving wheel 9fL.

A rear drive system Sr thereof also includes a first rear drive system SrR and a second rear drive system SrL. Therefore, in the electric vehicle system 400, the drive motor 4 includes four motors, that is, a first front drive motor 4fR, a second front drive motor 4fL, a first rear drive motor 4rR, and a second rear drive motor 4rL.

In the electric vehicle system 400 of the present modification, the electric vehicle control method according to the present invention can be executed by, for example, appropriately distributing the parameters of the front drive system Sf to the first front drive system SfR and the second front drive system SfL and appropriately distributing the parameters of the rear drive system Sr to the first rear drive system SrR and the second rear drive system SrL while executing the same control method as that of the above-described embodiment.

Although the embodiments of the present invention are described above, the above embodiments are merely a part of application examples of the present invention, and do not mean that the technical scope of the present invention is limited to the specific configurations of the above embodiments.

The invention claimed is:

1. An electric vehicle control method for controlling a driving force of each drive system in an electric vehicle equipped with a plurality of drive systems each including a drive motor, the method comprising:
    basic torque distribution processing of determining a basic torque command value for each drive motor based on a total required driving force for the electric vehicle and driving force distribution for each of the drive systems;
    vibration damping processing of obtaining a corrected torque command value by performing correction on each basic torque command value using a vibration compensation torque for reducing vibration of a driving force transmission system; and
    driving force control processing of controlling a driving force generated by each drive motor based on the corrected torque command value, wherein:
    the vibration damping processing includes:
        estimating whether each of the drive systems is in a dead zone section individually, and
        adjusting an amount of the vibration compensation torque for the drive system in the dead zone section according to the driving force distribution.

2. The electric vehicle control method according to claim 1, wherein:
    the vibration damping processing includes:
        calculating the vibration compensation torque by multiplying a torsional angular velocity estimation value of a drive shaft in each of the drive systems by a predetermined feedback gain, and
        setting the feedback gain in the dead zone section to a dead zone gain according to an increase or decrease in the driving force distribution.

3. The electric vehicle control method according to claim 2, wherein:
    the vibration damping processing includes:
        determining the dead zone gain so that a timing at which the drive system passes through the dead zone section is substantially constant regardless of the driving force distribution.

4. The electric vehicle control method according to claim 2, wherein:
    the vibration damping processing includes:
        using a vehicle model obtained by modeling the driving force transmission system of the electric vehicle to calculate the torsional angular velocity estimation value used for calculating the vibration compensation torque.

5. The electric vehicle control method according to claim 4, wherein:
    the vibration damping processing further includes:
        obtaining a torsional angle estimation value of the drive shaft in each of the drive systems using the vehicle model, and estimating whether each of the drive systems is in the dead zone section by referring to the torsional angle estimation value.

6. The electric vehicle control method according to claim 2, wherein:
among the drive systems, the dead zone gain of the drive system to which a relatively large driving force is distributed is made smaller than a normal gain that is set when the drive system is in a section other than the dead zone section.

7. The electric vehicle control method according to claim 2, wherein:
among the drive systems, the dead zone gain of one of the drive systems having a characteristic that the dead zone section is the shortest when all the driving force is distributed thereto is made smaller than a normal gain that is set when the drive system is in a section other than the dead zone section.

8. An electric vehicle control device for controlling a driving force of each drive system in an electric vehicle equipped with a plurality of drive systems each including a drive motor, the device comprising:

a basic torque distribution unit configured to determine a basic torque command value for each drive motor based on a total required driving force for the electric vehicle and driving force distribution for each of the drive systems;

a vibration damping unit configured to obtain a corrected torque command value by performing correction on each basic torque command value using a vibration compensation torque for reducing vibration of a driving force transmission system; and a driving force control unit configured to control a driving force generated by each drive motor based on the corrected torque command value, wherein:

the vibration damping unit is configured to:
estimate whether each of the drive systems is in a dead zone section individually, and
adjust an amount of the vibration compensation torque for the drive system in the dead zone section according to the driving force distribution.

\* \* \* \* \*